US011473842B2

(12) United States Patent
Tamaki et al.

(10) Patent No.: US 11,473,842 B2
(45) Date of Patent: Oct. 18, 2022

(54) MELTING WORK DEVICE AND MELTING WORK METHOD

(71) Applicant: SINTOKOGIO, LTD., Nagoya (JP)

(72) Inventors: Kenji Tamaki, Toyokawa (JP); Takahiro Yano, Toyokawa (JP); Masayuki Ishikawa, Toyokawa (JP)

(73) Assignee: SINTOKOGIO, LTD., Nagoya (JP)

( * ) Notice: Subject to any disclaimer, the term of this patent is extended or adjusted under 35 U.S.C. 154(b) by 0 days.

(21) Appl. No.: 16/764,978

(22) PCT Filed: Oct. 23, 2018

(86) PCT No.: PCT/JP2018/039268

§ 371 (c)(1),
(2) Date: May 18, 2020

(87) PCT Pub. No.: WO2019/116729

PCT Pub. Date: Jun. 20, 2019

(65) Prior Publication Data

US 2020/0400376 A1 Dec. 24, 2020

(30) Foreign Application Priority Data

Dec. 12, 2017 (JP) ............................ JP2017-237281

(51) Int. Cl.
*F27D 3/15* (2006.01)
*B25J 13/08* (2006.01)
(Continued)

(52) U.S. Cl.
CPC ......... *F27D 3/1563* (2013.01); *B22D 43/007* (2013.01); *B25J 13/08* (2013.01); *F27B 14/20* (2013.01)

(58) Field of Classification Search
CPC ........ B22D 43/007; B25J 13/08; F27B 14/08; F27B 14/20; F27D 21/00; F27D 3/15; F27D 3/1563; F27D 3/1554; F27D 3/1545
(Continued)

(56) References Cited

U.S. PATENT DOCUMENTS 3,256,431 A * 6/1966 Fraser .................. G01N 23/223 378/47
3,894,727 A * 7/1975 Salmon ................ F27D 3/1563 266/160
(Continued)

FOREIGN PATENT DOCUMENTS

CN 203593765 U 5/2014
EP 3 165 618 A1 5/2017
(Continued)

OTHER PUBLICATIONS

Dec. 11, 2018 International Search Report issued in International Patent Application No. PCT/JP2018/039268.

*Primary Examiner* — Scott R Kastler
*Assistant Examiner* — Michael Aboagye
(74) *Attorney, Agent, or Firm* — Oliff PLC

(57) ABSTRACT

A melting work device and a melting work method by which work can be easily performed on a melting furnace without a worker approaching the melting furnace. A melting work device performs work on a melt obtained by melting a material in a melting furnace. The melting work device has a drive mechanism; and a plurality of work tools that are operated by the drive mechanism; wherein the drive mechanism is able to move the work tools in an arbitrary direction at an arbitrary location above the melting furnace.

28 Claims, 20 Drawing Sheets

(51) Int. Cl.
*F27B 14/20* (2006.01)
*B22D 43/00* (2006.01)

(58) Field of Classification Search
USPC .......................... 266/227, 228, 287; 210/525
See application file for complete search history.

(56) References Cited

U.S. PATENT DOCUMENTS 4,415,144 A * 11/1983 Klotz .................... F27D 3/1554 222/412
4,728,875 A * 3/1988 Murthy ................ B22D 11/186 318/642
5,051,180 A * 9/1991 Williams ............. B22D 43/007 210/241
5,360,204 A * 11/1994 Mancuso .............. F27D 3/1563 266/226
5,536,295 A * 7/1996 Slovich ................... C22B 26/22 75/604
8,153,050 B2 * 4/2012 Sheng .................. B22D 43/007 266/228
10,151,534 B2 * 12/2018 Epps ..................... F27D 3/1563

FOREIGN PATENT DOCUMENTS

EP 3165618 * 5/2017 ........... B22D 43/007
JP S59-47305 A 3/1984
JP S61-285385 A 12/1986
JP S61-288007 A 12/1986
JP S63-111424 A 5/1988
JP H05-240588 A 9/1993
JP H07-280450 A 10/1995
JP H10-096722 A 4/1998
JP H10-132809 A 5/1998
JP H11-262884 A 9/1999
JP 2011-033315 A 2/2011

* cited by examiner (a)

(b)

MELTING WORK DEVICE AND MELTING WORK METHOD

TECHNICAL FIELD

The present invention relates to a melting work device and a melting work method.

BACKGROUND

Conventionally, casting, in which a metal is melted in a melting furnace to form a melt, and the melt is poured into a mold and solidified in a desired shape, is widely performed.

Patent Document 1 discloses an induction melting furnace that is used to melt metals.

When using a melting furnace as disclosed in Patent Document 1 to melt a metal, various types of work are performed, such as measuring the temperature of the melt, removing slag, which is composed of impurities and the like that have been separated from the metal by being melted, charging auxiliary materials for adjusting the components in the melt, sampling to acquire samples of the molten metal for analysis, and the like.

CITATION LIST

Patent Literature

Patent Document 1: JP H7-280450 A

SUMMARY OF INVENTION

Technical Problem

Extremely high temperatures are reached in the environs of a melting furnace. Additionally, for example, when removing slag in a crucible-type melting furnace, a worker inserts the tip of a round bar into the melting furnace, makes the slag adhere to the round bar, and raises the round bar. However, slag is heavy, thus burdening the worker.

Accordingly, work that is performed by a worker directly approaching a melting furnace is sweltering work involving heavy labor. Therefore, it is desirable to reduce the burden on workers.

A problem that is to be solved by the present invention is to provide a melting work device and a melting work method by which work can be easily performed on a melting furnace without a worker approaching the melting furnace.

Solution to Problem

The present invention employs the means indicated below in order to solve the above-mentioned problem. Specifically, the present invention provides a melting work device for performing work on a melt obtained by melting a material in a melting furnace, the melting work device comprising a drive mechanism; and a plurality of work tools that are operated by the drive mechanism; wherein the drive mechanism is able to move the work tools in an arbitrary direction at an arbitrary location above the melting furnace.

Additionally, the present invention provides a melting work method for performing work on a melt obtained by melting a material in a melting furnace, the melting work method comprising fixing, to a drive mechanism, an arbitrary work tool among a plurality of work tools; using the drive mechanism to lower the work tool at an arbitrary location above the melting furnace and to move the work tool to an arbitrary location; and using the drive mechanism to raise the work tool.

Advantageous Effects of Invention

The present invention is able to provide a melting work device and a melting work method by which work can be easily performed on a melting furnace without a worker approaching the melting furnace.

DESCRIPTION OF EMBODIMENTS

Figure 1:
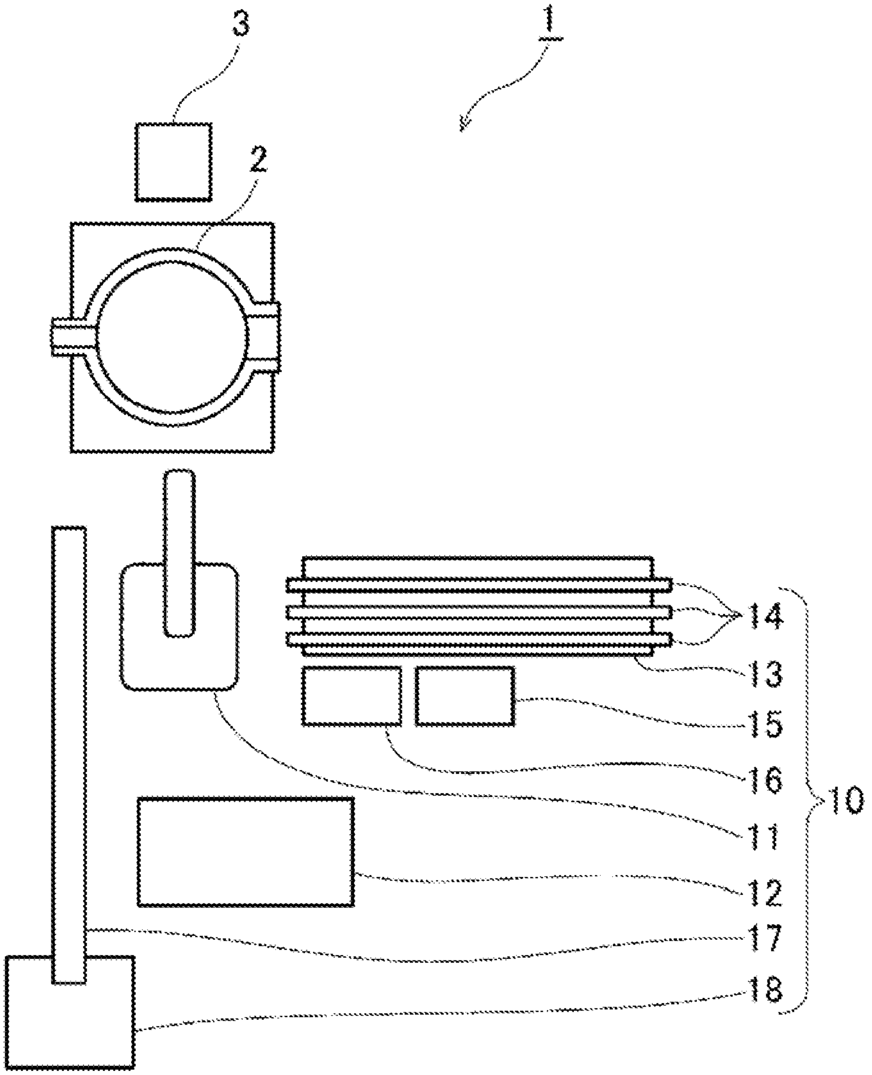
FIG. 1 is a schematic plan view of melting equipment in an embodiment of the present invention.

Hereinafter, the embodiments of the present invention will be explained by referring to the drawings.

The melting work device in the present embodiment comprises a drive mechanism, and a plurality of work tools that are operated by the drive mechanism. The drive mechanism is able to move the work tools in an arbitrary direction at an arbitrary location above a melting furnace.

Figure 2:
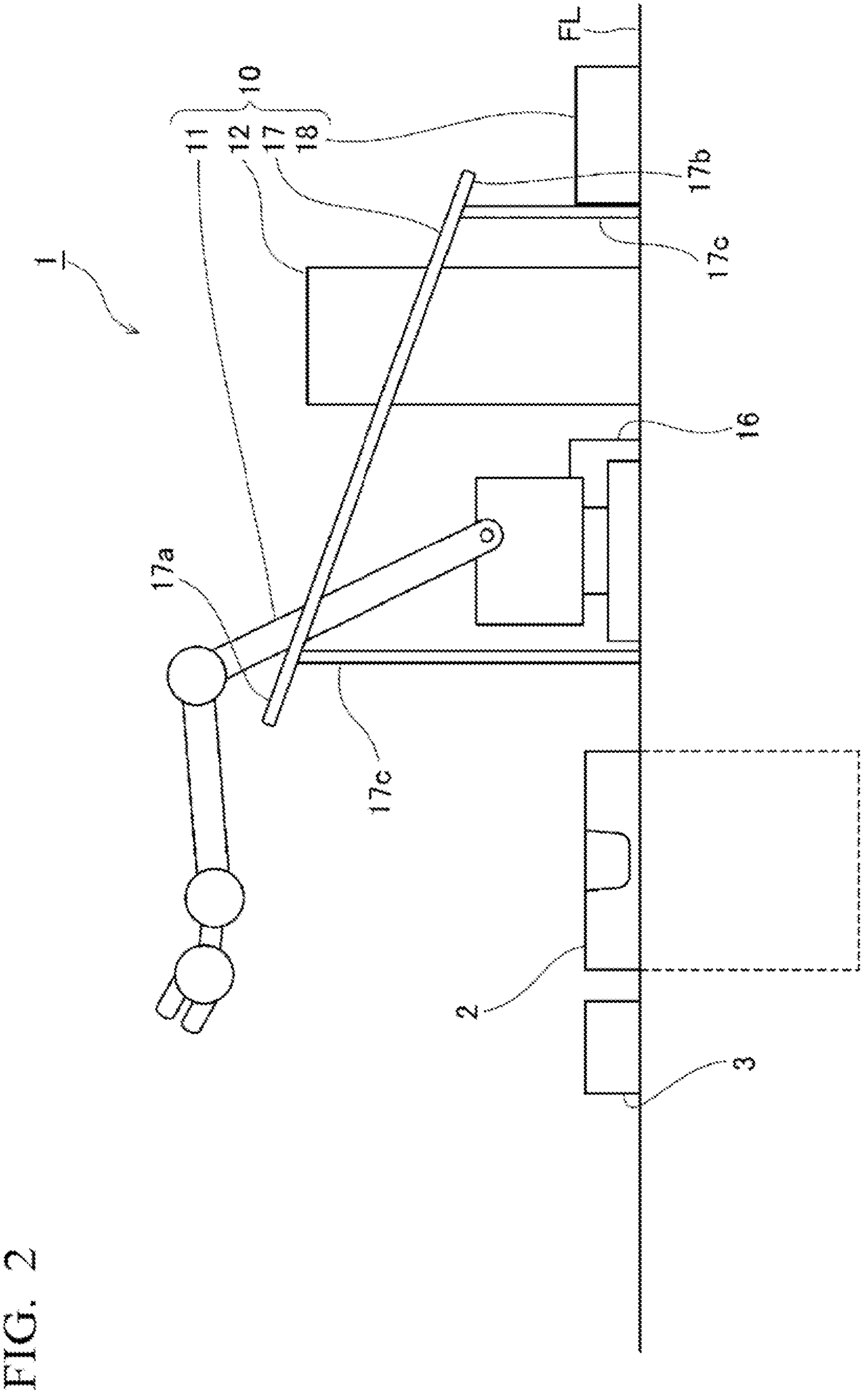
FIG. 2 is a side view of the above-mentioned melting equipment.

FIG. 1 is a schematic plan view of melting equipment 1 comprising a melting work device according to the present embodiment. FIG. 2 is a side view of the melting equipment 1.

The melting equipment 1 is, for example, equipment for melting a metal such as scrap and forming a melt. In the present embodiment, in particular, casting steel is melted. The melting equipment 1 comprises a melting furnace 2 for melting the metal.

Figure 3:
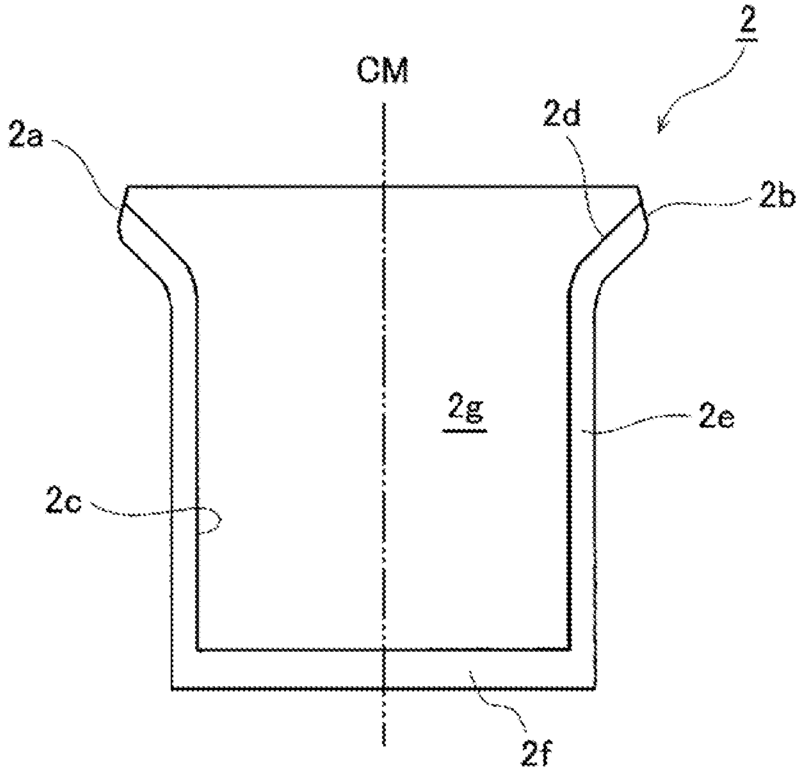
FIG. 3 is a vertical section view of a melting furnace in the above-mentioned melting equipment.

FIG. 3 is a vertical section view of a melting furnace 2. The melting furnace 2 comprises a cylindrical side wall 2*e* provided so that an axis CM extends in the up-down direction, and a bottom wall 2*f* provided so as to block the opening on the underside of the side wall 2*e*. The side wall 2*e* and the bottom wall 2*f* form an interior space 2*g* into which a metal is charged and melted. The side wall 2*e* and the bottom wall 2*f*, particularly near the inside surface 2*c* forming the interior space 2*g*, is made of a highly heat-resistant material such as, for example, alumina-magnesia.

In the present embodiment, the melting furnace 2 is an induction furnace that melts the metal by generating an induction current by supplying an electric current to a conductor (not illustrated) such as, for example, a coil, provided on the outer circumference of the side wall 2*e*.

A melt outlet 2*a* and a slag outlet 2*b* are provided on the upper end of the melting furnace 2.

The melt outlet 2*a* is provided so as to protrude outward in the radial direction of the cylindrical shape. The molten metal is extracted through the melt outlet 2*a*, for example, by tilting the melting furnace 2 in the direction of the melt outlet 2*a* with a receiving pan (not illustrated) provided below the melt outlet 2*a*.

As will be explained below by referring to FIG. 18, the slag outlet 2*b* is provided in order to discharge, from the melting furnace 2, slag, which is composed of impurities and the like that have been separated from the metal by being melted. On the side wall 2*e* of the melting furnace 2, an inclined portion 2*d*, at which the surface of the inside surface 2*c* is inclined, is formed near the slag outlet 2*b*.

The melting furnace 2 is tilted in the directions of the melt outlet 2*a* and the slag outlet 2*b* by a tilting device (not illustrated) provided on the melting furnace 2 itself.

The melting equipment 1 comprises a slag disposal box 3 for collecting the slag removed from the melting furnace 2.

The melting equipment 1 comprises a melting work device 10 for performing work on a melt formed by melting material in the melting furnace 2.

The melting work device 10 comprises a drive mechanism 11, a control device 12, a work tool rack 13, work tools 14, a probe rack 15, an auxiliary material weighing machine 16, a chute 17, and an ingot-receiving container 18. The melting work device 10 also comprises a teach pendant 19 and an input device 20, which are explained below with reference to FIG. 6.

The melting work device 10 uses these features to perform various types of work such as measuring the temperature of the melt, removing slag, which is composed of impurities and the like that have been separated from the metal by being melted, charging auxiliary materials for adjusting the components in the melt, sampling to acquire samples of the molten metal for analysis, and the like.

Figure 4:
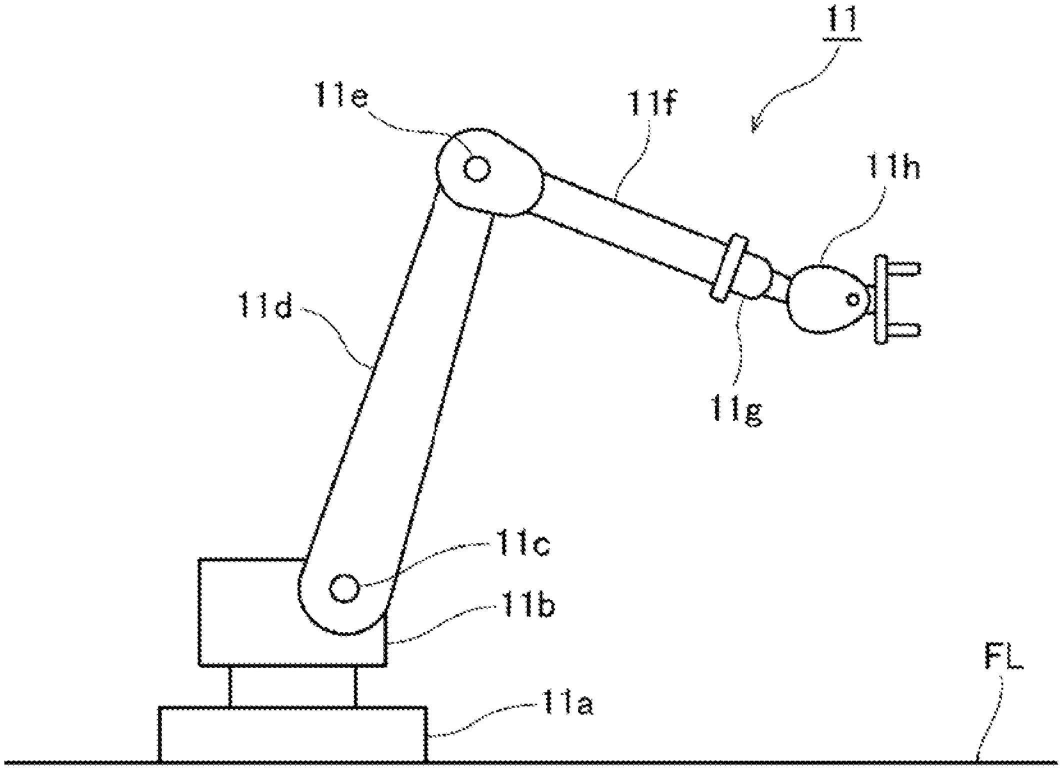
FIG. 4 is a side view of a drive mechanism in the above-mentioned melting equipment.

FIG. 4 is a side view of a drive mechanism 11 in the melting equipment 10. In the present embodiment, the drive mechanism 11 is, for example, a robot arm such as a six-axis robot. The drive mechanism 11 comprises a pedestal 11*a*, a base 11*b*, a long lower arm portion 11*d*, an upper arm portion 11*f*, and a wrist portion 11*h*.

The pedestal 11*a* is affixed to a floor surface FL. The base 11*b* is provided on the pedestal 11*a* so as to be rotatable, within the horizontal plane, relative to the pedestal 11*a*.

The lower arm portion 11*d* has one end connected to the base 11*b* by means of a first shaft 11*c*, and is provided so as to be able to pivot about the first shaft 11*c*, in the up-down direction, relative to the base 11*b*.

On the other end of the lower arm portion 11*d*, one end of the upper arm portion 11*f* is connected by a second shaft 11*e*. As a result thereof, the upper arm portion 11*f* is provided so as to be able to pivot about the second shaft 11*e*, in the up-down direction, relative to the lower arm portion 11*d*.

On the other end of the upper arm portion 11*f*, a wrist portion 11*h* is connected by a wrist connection portion 11*g*. The wrist connection portion 11*g* has a structure allowing the wrist portion 11*h* to be bent with respect to the upper arm portion 11*f*, and to be axially rotated with respect to the upper arm portion 11*f*.

Figure 5:
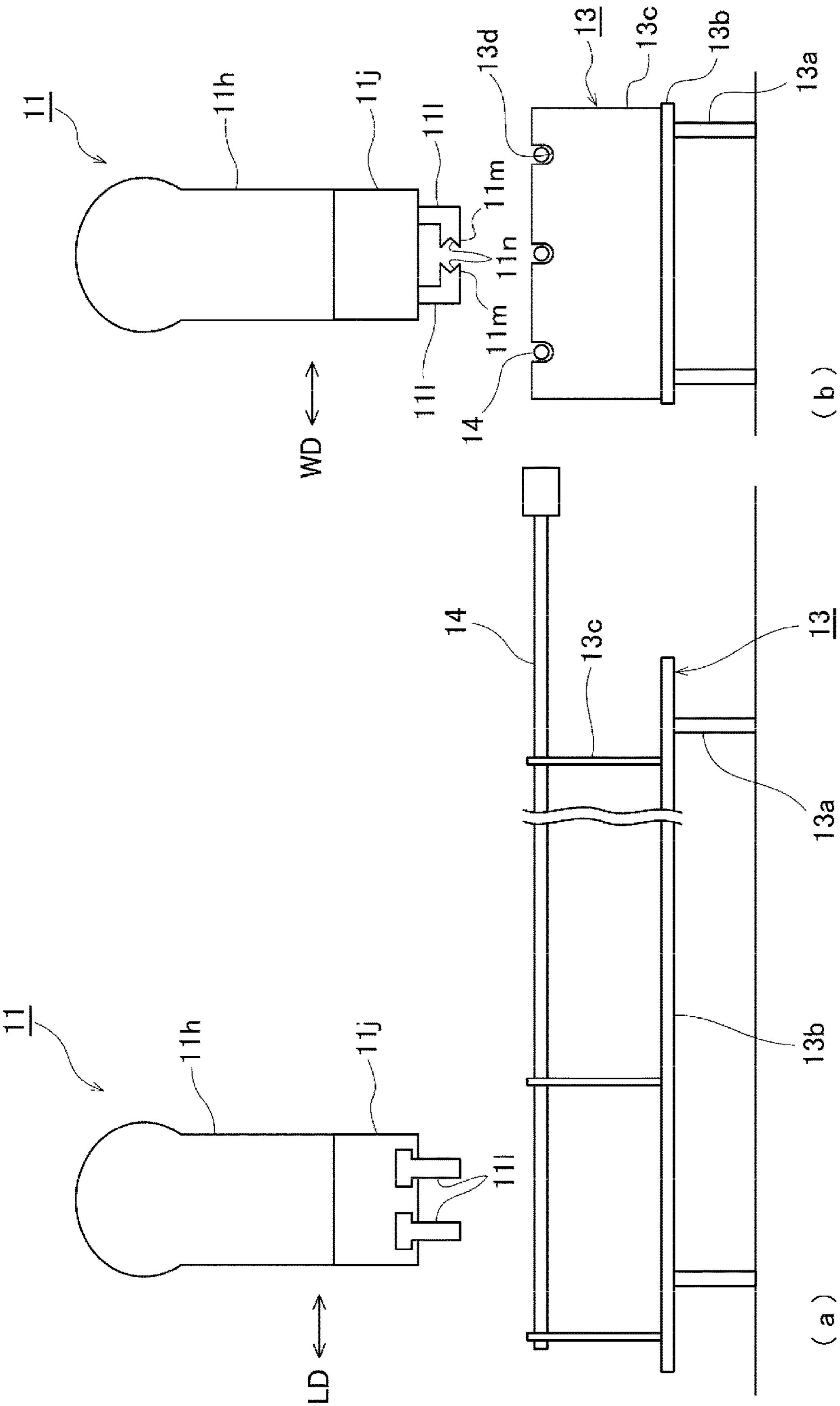
FIG. 5 is a (a) front view and a (b) side view of a work tool rack and a wrist portion of the above-mentioned drive mechanism.

FIG. 5(*a*) is a front view of the wrist portion 11*h* of the drive mechanism 11 and a work tool rack 13 to be explained below, and FIG. 5(*b*) is a side view.

On the tip of the wrist portion 11*h*, gripping portions 11*j* are provided so as to be able to rotate about the axis of the wrist portion 11*h*.

The gripping portions 11*j* are provided with a total of two sets of gripping tip portions 11*l*, two of which are combined to form each set. In each set of gripping tip portions 11*l*, two gripping tip portions 11*l* are provided so as to face each other and so as to separate from and approach each other. The gripping tip portions 11*l* are shaped so that the tips thereof bend towards the opposing gripping tip portion 11*l*. As a result thereof, in each set, inner ends 11*m*, which are the tips of the bent portions of the gripping tip portions 11*l*, are provided so as to face each other.

Notches 11*n* are formed in the inner ends 11*m*. As mentioned below, the wrist portion 11*h* of the drive mechanism 11 grips a long rod forming a work tool 14. The notches 11*n* are formed to have shapes such that, when the opposing gripping tip portions 11*l* approach each other, the surfaces of the notches 11*n* in the two opposing gripping tip portions 11*l* come into contact with the outer circumference of the rod and are able to firmly grip the rod.

The drive mechanism 11 is able to be controlled by the control device 12 to be explained next, so that the work tool 14 can be moved in an arbitrary direction, including in the up-down direction, at an arbitrary location above the melting furnace 2.

Figure 6:
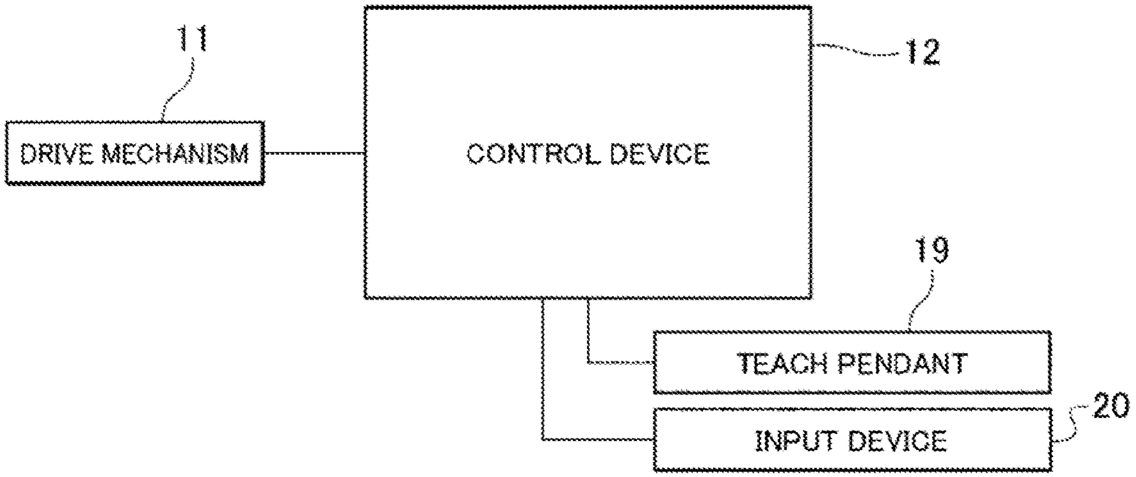
FIG. 6 is a block diagram of a melting work device in the above-mentioned melting equipment.

FIG. 6 is a block diagram of the melting work device 10. The control device 12 is connected to the drive mechanism 11, the teach pendant 19, and the input device 20.

The control device 12 stores a program prepared by means of the teach pendant 19. In other words, using the teach pendant 19, a worker, for example, actually operates the drive mechanism 11 for the purpose of teaching, and the control device 12 learns and records the operations, thereby accumulating the operations made by the drive mechanism 11 in the control device 12. The control device 12 controls the driving of the drive mechanism 11, for example, by reproducing the operations learned by the teaching.

Thus, the drive mechanism 11 is controlled by the control device 12, more specifically, by means of a program that is prepared by teaching and recorded in the control device 12.

There are cases in which the drive mechanism 11 must perform work requiring precise movement.

Additionally, there are cases in which the drive mechanism 11 must perform work strongly dependent on the results of observation, by the worker, of the conditions inside the melting furnace 2. For example, as described above, the drive mechanism 11 removes slag floating on the melt surface of the melt. Slag appears at uncertain locations on the melt surface of the melt. Additionally, the timing at which the slag appears and the amount thereof vary depending on various factors, such as the surrounding environment, the quality and purity of the charged metals, and the like. For this reason, it is not easy to sufficiently remove slag by controlling the drive mechanism 11 by means of a program prepared by teaching alone.

Thus, the input device 20 is provided in order to perform such work requiring precise movement and work that depends on the judgment of the worker without depending on teaching. When a worker operates the input device 20, the drive mechanism 11 is remotely operated by means of input to the input device 20. In other words, the worker can remotely operate the drive mechanism 11 directly by means of the control device 12.

In the explanation below, when it is described that the control device 12 controls the drive mechanism 11, this includes not only the case in which the drive mechanism 11 is controlled by a program prepared by means of teaching and stored in the control device 12, but also the case in which the drive mechanism 11 is remotely controlled by the worker by means of the input device 20 and the control device 12.

In the present embodiment, more specifically, it is assumed that the measurement of the temperature of the melt, the charging of auxiliary materials, sampling, and detection of the position of the melt height, to be explained below, are performed by a program prepared by means of teaching, and that the removal of slag is performed by remote operation or by combining and appropriately switching between a program and remote operation. However, it goes without saying that the present invention is not limited thereto.

The control operations actually performed by the control device 12 during the above-mentioned work will be explained in correspondence with the parts constituting the melting work device 10 when explaining those parts.

The control device 12 is configured so as to be able to recognize the amount of rotation and the amount of movement of each movable portion of the drive mechanism 11. As a result thereof, the control device 12 can accurately recognize the current orientation of the drive mechanism 11, i.e., the spatial position of the wrist portion 11*h*. For this reason, by having the wrist portion 11*h* always grip a prescribed location on the rod of the work tool 14, it is possible to recognize the spatial position of the portion performing each type of work provided on the tip of the work tool 14.

The control device 12, the teach pendant 19, and the input device 20 are provided at a distance from the drive mechanism 11.

As illustrated in FIG. 1, the work tool rack 13 is provided near the drive mechanism 11. As illustrated in both drawings in FIG. 5, the work tool rack 13 comprises legs 13*a*, a base 13*b*, and work tool supports 13*c*.

The base 13*b* is a rectangular plate having a length corresponding to the rods of the work tools 14 to be described below, this plate being located substantially parallel to the floor surface FL and fixed above the floor surface FL by means of the legs 13*a*.

On the upper side of the base 13*b*, a plurality of work tool supports 13*c* are provided so as to be separated from each other in the lengthwise direction of the base 13*b*. The work tool supports 13*c* are formed so as to be substantially rectangular and positioned so as to extend in the up-down direction, and the lower side edges are bonded to the upper surface of the base 13*b*.

Notches 13*d* are provided on the upper edges of the work tool supports 13*c*. The notches 13*d* are formed so as to be larger than the outer diameters of the rods of the work tools 14 to be explained below. As illustrated in the drawings in FIG. 5, when the work tools 14 are not being used, the rods are placed on the work tool rack 13 so as to lie across the work tool supports 13*c* while also being received in the notches 13*d* formed in the respective work tool supports 13*c*. The control device 12 controls the drive mechanism 11 so that a work tool 14 placed on the work tool rack 13 is gripped by the gripping portions 11*j* and work is performed, and after the work has ended, the work tool 14 is replaced on the work tool rack 13.

The probe rack 15 illustrated in FIG. 1 is a rack for storing replacement probes for a thermometer used when measuring the temperature of the melt, as explained below.

The auxiliary material weighing machine 16 automatically weighs an auxiliary material, to be explained below, when charging the auxiliary material, and discharges a fixed amount of the auxiliary material.

The chute 17 is a slide for automatically conveying, by their own weight, ingots that have been formed by sampling.

As illustrated in FIG. 2, the chute 17 is provided so as to be supported by support stands 17*c* so that one end 17*a* is located towards the melting furnace 2 and the other end 17*b* is located towards the control device 12. The one end 17*a* towards the melting furnace 2 is positioned to be higher than the other end 17*b*.

An ingot-receiving container 18 is provided under the other end 17*b* of the chute 17.

The melting work device 10 comprises a plurality of work tools 14 that are operated by a drive mechanism 11. The plurality of work tools 14, as will be explained successively below, comprise a melt surface detection tool 30, a sampling tool 40, a temperature measurement tool 50, first to fifth slag removal tools (slag removal tools) 60, 70, 80, 90, and 100, and an auxiliary material charging tool 110.

Figure 7:
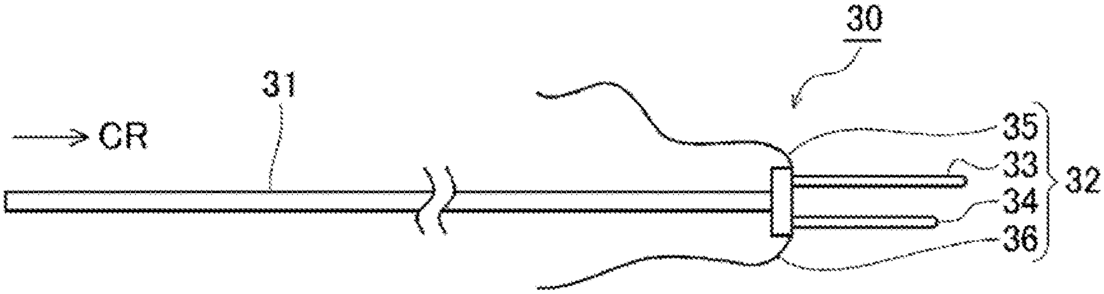
FIG. 7 is a side view of a melt surface detection tool in the above-mentioned melting work device.

First, the melt surface detection tool 30 will be explained. FIG. 7 is a side view of a melt surface detection tool 30. The melt surface detection tool 30 comprises a rod 31, and a melt surface detection portion 32 that is provided on the tip of the rod 31 and that detects the height position of the melt surface of the melt. The melting work device 10 uses the melt surface detection tool 30 to detect the height position of the melt surface of the melt.

As explained above, the work in a melting furnace includes measuring the temperature of the melt, removing slag, charging auxiliary materials, sampling, and the like. Of these types of work, those other than charging auxiliary materials are performed by immersing the tip of the work tool 14 gripped by the gripping portions 11*j* of the drive mechanism 11 deeper into the melt than the melt surface, using the height of the melt surface of the melt as a reference. When a worker is to perform this work manually, there is no need to measure the height position of the melt surface of the melt by means of measuring devices or the like because the relative positional relationship between the tip of the work tool 14 and the melt surface of the melt can always be visually recognized.

However, when the drive mechanism 11 is controlled, in particular, not by remote operation by using the input device 20, but by a program prepared by teaching, the drive mechanism 11 and the control device 12 themselves cannot recognize the relative positional relationship between the tip of the work tool 14 and the melt surface of the melt. Therefore, in order to perform the above-mentioned work, it is necessary to always keep the height position of the melt surface fixed and to have the height position be stored as a fixed value in the control device 12, or to make it possible to always detect the height position of the melt surface by some means.

In this case, for the reason indicated below, it is not easy to keep the height position of the melt surface of the melt at a fixed location. First, it is not easy to always charge a fixed amount of metal into the melting furnace 2 so that the height position of the melt surface of the melt is kept fixed, particularly when the charged metal is scrap or the like. Additionally, since the inside surface 2*c* of the melting furnace 2 is etched little by little due to the stirring of the melt, by chemical reactions with the inside surface 2*c*, and the like, the interior space 2*g* increases as melting is repeated. In other words, even if it were possible to always charge a fixed amount of metal into the melting furnace 2, the height position of the melt surface of the melt changes little by little as the melting of metals is repeated.

For this reason, in the present melting work device 10, the control device 12 controls the drive mechanism 11 so that the height position of the melt surface of the melt is detected before the various types of work are performed by the drive mechanism 11.

The melt surface detection portion 32 of the melt surface detection tool 30 comprises a first electrode 33 and a second electrode 34, which are rod-shaped. In the present embodiment, the first electrode 33 and the second electrode 34 are fabricated from ϕ 6 mm round bars made of general structural rolled steel material. However, there is no limitation thereto, and any conductive material may be applied.

The melt surface detection portion 32 also comprises a first conductor 35 and a second conductor 36 connected to the ends, on the side towards the rod 31, of the first electrode 33 and the second electrode 34, respectively. The ends (not illustrated) of the first conductor 35 and the second conductor 36 that are not connected to the first electrode 33 and the second electrode 34 are connected, for example, to an electric current sensor or the like. As a result thereof, when an electric current passes between the first electrode 33 and the second electrode 34, this electric current can be detected.

The melting work device 10 moves the melt surface detection tool 30 in an arbitrary direction, including the up-down direction, at an arbitrary location above the melting furnace 2.

More specifically, the control device 12 controls the drive mechanism 11 so that, with the rod 31 of the melt surface detection tool 30 positioned between the notches 11*n* in the opposing gripping tip portions 11*l* of the gripping portions 11*j* of the drive mechanism 11, the gripping tip portions 11*l* are brought close to each other, thereby gripping the rod 31. The control device 12 controls the drive mechanism 11 so that, with the tips of the first electrode 33 and the second electrode 34 that protrude from the rod 31 facing downward, the melt surface detection tool 30 is moved and positioned at an arbitrary location above the melting furnace 2, and thereafter lowered towards the melt in the melting furnace 2.

In this case, since the melt in the melting furnace 2 is a metal that is conductive, an electric current flows through the first conductor 35 and the second conductor 36 at the time the first electrode 33 and the second electrode 34 are lowered and the tips thereof both come into contact with the melt. This electric current is detected by the above-mentioned electric current sensor or the like. The control device 12 computes the positions of the tips of the first electrode 33 and the second electrode 34 at the time the electric current is detected on the basis of the state of the drive mechanism 11 at this time, for example, based on the amount of rotation, the amount of movement, or the like of the movable parts, thereby detecting and storing the height position of the melt surface of the melt.

Figure 8:
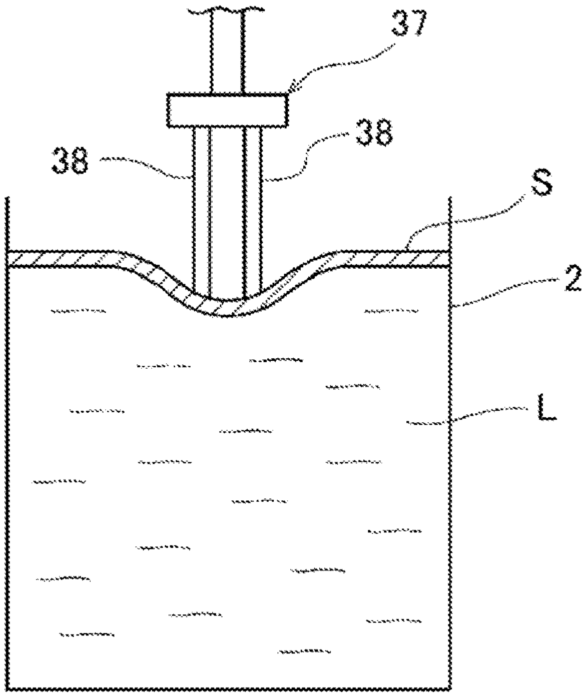
FIG. 8 is a diagram for explaining a case in which two electrodes are of equal length in the above-mentioned melt surface detection tool.

In the present embodiment, the first electrode 33 is provided so as to protrude further from the rod 31 than the second electrode 34 does. In order to explain the reason for this, the case in which the lengths of protrusion of the two electrodes from the rod are the same will be explained. FIG. 8 is a diagram for explaining the melt surface detection tool 37 when the lengths of the two electrodes 38 are equal.

As mentioned above, the slag S appears at uncertain locations on the melt surface of the melt L. When the lengths of protrusion of the two electrodes 38 from the rod are the same, the two electrodes 38 can sometimes come into contact with the slag S simultaneously when moving the rod downward. Since the slag S does not conduct electric current, at this time, electric current does not flow across the electrodes 38.

In the layer of slag S, the lower side faces the melt L and is therefore hot and soft, but the upper side comes into contact with air, cools and hardens. Therefore, even when the rod is moved further downward, the electrodes 38 come into contact with this hard surface of the slag S, and the force pressing against the slag S when the electrodes 38 are moved downward is divided between the two electrodes 38. For this reason, there are cases in which the tips of the electrodes 38 cannot penetrate through the layer of slag S, as illustrated in FIG. 8. As a result thereof, the layer of slag S can sometimes curve downward so that the tips of the electrodes 38 are positioned lower than the height position of the melt surface of the melt L.

When the rod is moved further downward until the force by which the tips of the electrodes 38 press against the surface of the slag S exceeds the hardness of the upper surface of the slag S, both of the two electrodes 38 pierce through the slag S and plunge into the melt L, so that an electric current flows between the electrodes 38. However, as mentioned above, by this time, the tips of the electrodes 38 are already lower than the height position of the melt surface of the melt L, so the detected height position of the melt surface of the melt L becomes a position that is lower than the true height position.

Thus, with a melt surface detection tool 37 in the case in which the lengths of the two electrodes 38 are equal, as mentioned above, there are cases in which a position lower than the actual height position of the melt surface of the melt L is detected as the height position of the melt surface. For this reason, when this height position is used as a reference to perform subsequent work, there is a possibility that the control device 12 will control the drive mechanism 11 so that the work tool 14 gripped by the drive mechanism 11 is plunged deeper than necessary into the melt in the melting furnace 2.

Figure 9:
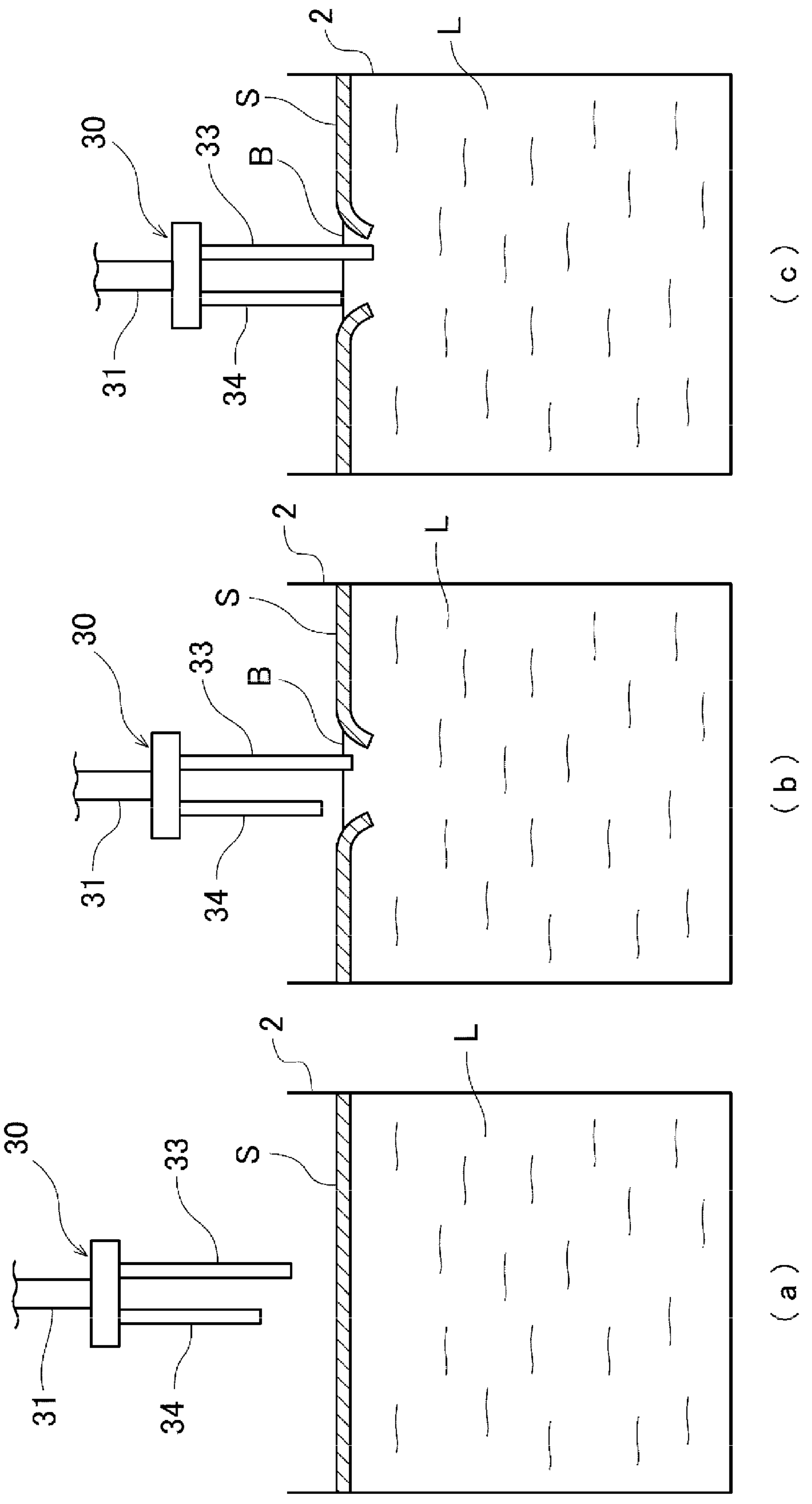
FIG. 9 is a diagram for explaining melt surface detection using the above-mentioned melt surface detection tool.

In order to suppress detection error in the height position of the melt L caused by factors such as those described above, in the melt surface detection tool 30 in the present embodiment, the first electrode 33 is provided so as to protrude further from the rod 31 than the second electrode 34 does. FIG. 9 is a diagram for explaining such melt surface detection using a melt surface detection tool 30.

First, as illustrated in FIG. 9(*a*), the control device 12 controls the drive mechanism 11 so that the tips of the first electrode 33 and the second electrode 34 that protrude from the rod 31 are positioned on the lower side.

Thereafter, the control device 12 controls the drive mechanism 11 so that the melt surface detection tool 30 is lowered towards the melt L in the melting furnace 2. The first electrode 33 with the tip that protrudes further from the rod 31 makes contact with the surface of the slag S first. When the melt surface detection tool 30 is moved further downward, the force moving the melt surface detection tool 30 downward is concentrated on the tip of the first electrode 33, so that the tip of the first electrode 33 easily breaks the layer of slag S, exposing the melt surface B to the outside air, as illustrated in FIG. 9(*b*).

When the control device 12 controls the drive mechanism 11 so that the melt surface detection tool 30 is moved further downward, the tip of the second electrode 34 contacts the exposed melt surface B as illustrated in FIG. 9(*c*), and an electric current flows between the first electrode 33 and the second electrode 34. The control device 12 detects this electric current, computes the positions of the tips of the first electrode 33 and the second electrode 34 at this time based on the state of the drive mechanism 11 or the like at this time, and detects and stores the height position of the melt surface B of the melt L.

After the height position of the melt surface B of the melt L has been detected, the control device 12 controls the drive mechanism 11 so that the melt surface detection tool 30 is raised and moved near the work tool rack 13, and positioned with the rod 31 lying horizontally at a prescribed position above the work tool rack 13. Thereafter, the control device 12 controls the gripping tip portions 11*l* so as to be moved apart, thereby releasing the melt surface detection tool 30, and returning the melt surface detection tool 30 to the work tool rack 13.

As described above, the first electrode 33, which protrudes further, makes contact with the slag S first and breaks the layer of slag S, and the second electrode 34 comes into contact with the exposed melt surface B, thereby allowing detection error in the height position of the melt L caused by the slag S to be suppressed.

It is desirable for the first electrode 33 to protrude, for example, at least 3 cm further than the second electrode 34 does so that the second electrode 34 does not reach the height position of the melt surface B until the first electrode 33 breaks the layer of slag S.

Additionally, in order to make the second electrode 34 come into contact with the melt surface B exposed by the first electrode 33 breaking the layer of slag S, it is desirable for the distance between the first electrode 33 and the second electrode 34 to be approximately 2 to 3 cm or less.

Figure 10:
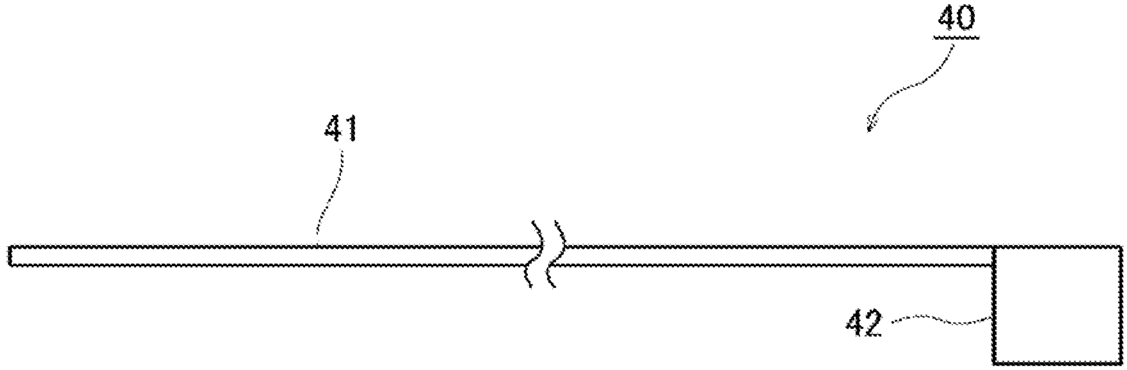
FIG. 10 is a (a) side view and a (b) perspective view of a sample preparation portion, of a sampling tool in the above-mentioned melting work device.
Figure 10:
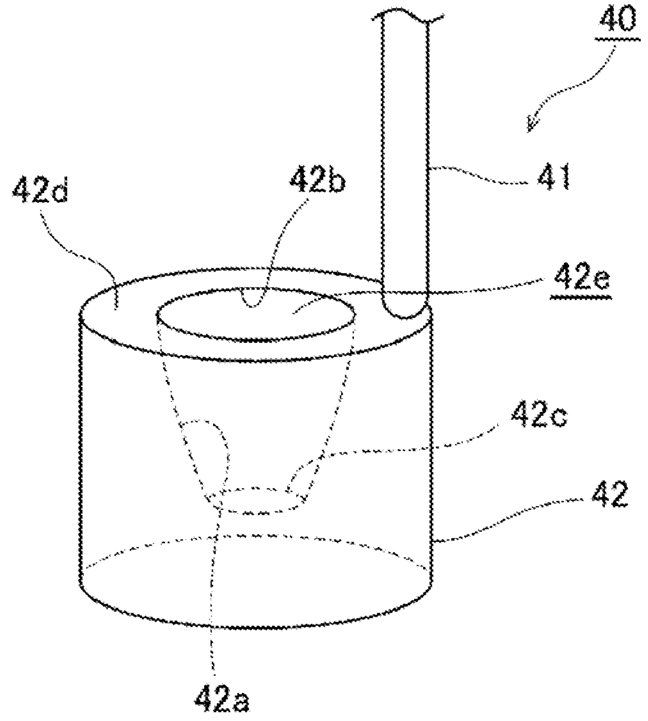

Next, the sampling tool 40 will be explained. FIG. 10(*a*) is a side view of a sampling tool 40 in the melting work device 10. The sampling tool 40 comprises a rod 41, and a sample-making portion 42 that is provided on the tip of the rod 41 and that is used to scoop up the melt to form ingots. The melting work device 10 uses the sampling tool 40 to form ingots, which are samples for analyzing the molten metal.

In general, sampling is often performed by using a ladle or the like to scoop up a melt and pour the melt into a mold.

In this case, in the present embodiment, the melting equipment 1 melts casting steel. Casting steel has a high solidification temperature, and unless the series of actions from using a ladle to scoop up the melt from the melting furnace 2 to pouring the melt into a mold is performed quickly, the melt can immediately cool and solidify before being poured into the mold. In particular, it is not easy to pour the melt into a mold, within the short time before the casting steel solidifies, by means of a drive mechanism 11 such as the robot arm in the present embodiment, because the drive mechanism 11 cannot work as quickly as a person can.

Therefore, in the present embodiment, the melt is not poured into a mold. Instead, based on the property in which casting steel easily cools, the melt is cooled and solidified in the state that it is in when scooped up from the melting furnace 2.

FIG. 10(*b*) is a perspective view of a sample-making portion 42. The sample-making portion 42 is formed so as to be substantially cylindrical, with one of the flat surfaces forming the upper surface 42*d*, and is joined to the rod 41 so that this upper surface 42*d* intersects with the rod 41. The sample-making portion 42 comprises a recess 42*a* on the upper surface 42*d*. The interior space 42*e* formed by the surface of this recess 42*a* is shaped so that the cross-sectional area thereof, in sectional views on planes parallel to the upper surface 42*d*, become gradually larger from the bottom surface 42*c* of the recess 42*a* to the opening 42*b*. Thus, the recess 42*a* is formed in a tapered shape so that the opening 42*b* is larger than the bottom surface 42*c*.

The sample-making portion 42 is made of a material having high thermal conductivity, for example, carbon.

Figure 11:
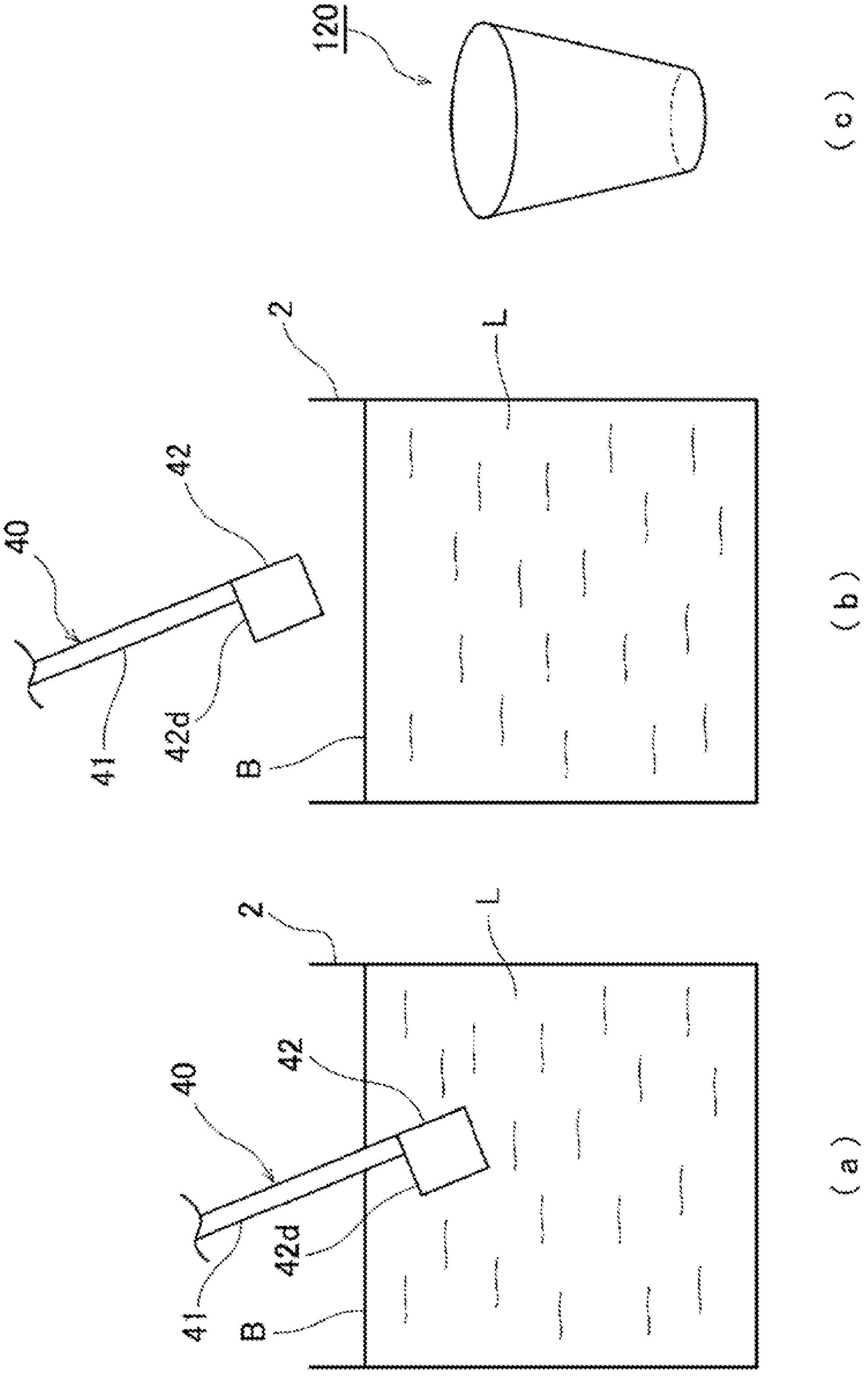
FIG. 11 is a diagram for explaining sampling using the above-mentioned sampling tool.

FIG. 11 is a diagram for explaining sampling using the sampling tool 40.

Sampling is preferably performed after first performing the slag removal to be explained below in order to suppress the adhesion of slag to the sampling tool 40.

The melting work device 10 moves the sampling tool 40 in an arbitrary direction, including the up-down direction, at an arbitrary location above the melting furnace 2.

More specifically, the control device 12 controls the drive mechanism 11 so that, with a rod 41 of the sampling tool 40 positioned between the notches 11*n* in the opposing gripping tip portions 11*l* of the gripping portions 11*j* of the drive mechanism 11, the gripping tip portions 11*l* are brought close to each other, thereby gripping the rod 41. The control device 12 controls the drive mechanism 11 so that, as illustrated in FIG. 11(*a*), with the sample-making portion 42 facing downward, the sampling tool 40 is moved and positioned at an arbitrary location above the melting furnace 2, and thereafter, the sampling tool 40 is tilted with respect to the vertical direction, and lowered towards the melt in the melting furnace 2.

In this case, the control device 12 controls the drive mechanism 11 so that at least the upper surface 42*d* of the sample-making portion 42 is lowered to a position below the height position of the melt surface B of the melt L measured beforehand by the melt surface detection tool 30.

Thereafter, as illustrated in FIG. 11(*b*), the control device 12 controls the drive mechanism 11 so that the sampling tool 40 is raised and the melt L is scooped up in the recess 42*a*.

At this time, the control device 12 controls the drive mechanism 11 so that the sampling tool 40 is raised with the rod 41 remaining in a tilted state relative to the vertical direction. By keeping the rod 41 in the tilted state, the amount of the melt L in the recess 42*a* occupies, for example, approximately 80% to 90% of the recess 42*a*, and it becomes unlikely that the melt L will remain on the upper surface 42*d*. As a result thereof, the solidification of the melt L on the upper surface 42*d* is suppressed, and situations in which it becomes difficult to extract the metal from the sample-making portion 42 due to metal that has solidified on the upper surface 42*d* adhering to the upper surface 42*d* are also suppressed. Thereafter, the angle of the sampling tool 40 is made perpendicular, and the melt surface of the melt L in the recess 42*a* is made substantially parallel to the upper surface 42*d*.

As mentioned above, the sample-making portion 42 is made of a material with high thermal conductivity, and in the present embodiment, the melt L is casting steel having a high solidification temperature, so the melt L that has been scooped up immediately cools and solidifies. The metal is released from the surface of the recess 42*a* because solidified metal shrinks, creating a slight gap between the surface of the recess 42*a* and the solidified metal, and furthermore, due to the effects of the draft angle in the recess 42*a* that is formed to have a tapered shape.

In this state, the control device 12 controls the drive mechanism 11 so that the sampling tool 40 is moved near the chute 17 illustrated in FIG. 1 and FIG. 2. Thereafter, the control device 12 controls the drive mechanism 11 so that the sampling tool 40 is inverted in the up-down direction and the upper surface 42*d* of the sample-making portion 42 is positioned facing downward directly above one end 17*a* of the chute 17 on the side towards the melting furnace 2. Then, the metal drops onto the one end 17*a* of the chute 17.

The dropped metal slides down the chute 17 in the direction towards the control device 12 and drops from the other end 17*b* into the ingot-receiving container 18. The dropped metal is utilized as the ingot 120 illustrated in FIG. 11(*c*).

After dropping the ingot 120 onto the chute 17, the control device 12 controls the drive mechanism 11 so that the sampling tool 40 is moved near the work tool rack 13 and positioned with the rod 41 lying horizontally at a prescribed position on the work tool rack 13. Thereafter, the control device 12 controls the gripping tip portions 11*l* so as to be moved apart, thereby releasing the sampling tool 40, and returning the sampling tool 40 to the work tool rack 13.

Figure 12:
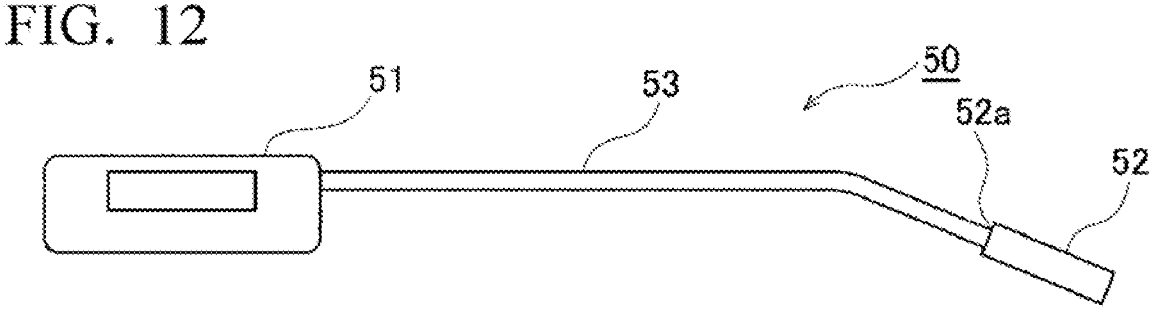
FIG. 12 is a side view of a temperature measurement tool in the above-mentioned melting work device.

Next, the temperature measurement tool 50 will be explained. FIG. 12 is a side view of the temperature measurement tool 50 in the melting work device 10. The temperature measurement tool 50 comprises a thermometer body 51, a probe 52, and a connection member 53 for connecting the temperature body 51 and the probe 52. The melting work device 10 uses this temperature measurement tool 50 to measure the temperature of the melt L.

In FIG. 12, the connection member 53 is formed so as to be bent, but it may be formed so as to be straight, without having a bent portion.

The melting work device 10 moves the temperature measurement tool 50 in an arbitrary direction, including the up-down direction, at an arbitrary location above the melting furnace 2.

More specifically, the control device 12 controls the drive mechanism 11 so that, with the thermometer body 51 or the connection member 53 of the temperature measurement tool 50 positioned between the notches 11*n* in the opposing gripping tip portions 11*l* of the gripping portions 11*j* of the drive mechanism 11, the gripping tip portions 11*l* are brought close to each other, thereby gripping the temperature measurement tool 50. The control device 12 controls the drive mechanism 11 so that, with the probe 52 facing downward, the temperature measurement tool 50 is moved and positioned at an arbitrary location above the melting furnace 2, and thereafter lowered towards the melt in the melting furnace 2.

In this case, the control device 12 controls the drive mechanism 11 so that at least the side of the probe 52 towards the tip is lowered to a position below the height position of the melt surface B of the melt L measured beforehand by the melt surface detection tool 30. This state is maintained for a prescribed period of time to measure the temperature of the melt L.

Thereafter, the control device 12 controls the drive mechanism 11 so that the temperature measurement tool 50 is raised and moved towards a worker who is stationed away from the melting furnace 2. The worker checks the melt temperature measurement results that are displayed on the thermometer body 51. Thereafter, the control device 12 controls the drive mechanism 11 so that, for example, a corner 52*a* of the probe 52 is made to catch and contact a corner or the like of the work tool rack 13, and the temperature measurement tool 50 is pulled in the direction opposite to the probe 52, i.e., the direction towards the thermometer body 51. Then, the probe 52, the movement of which is restricted by being caught, comes free from the connection member 53, exposing the tip (not illustrated) of the connection member 53. The control device 12 controls the drive mechanism 11 so that the temperature measurement tool 50 is moved to the probe rack 15 illustrated in FIG. 1, the tip of the connection member 53 is moved towards a new probe that is installed on the probe rack 15, and the new probe 52 is attached to the connection member 53.

After the probe 52 is replaced, the control device 12 controls the drive mechanism 11 so that the temperature measurement tool 50 is moved near the work tool rack 13, and positioned at a prescribed position above the work tool rack 13. Thereafter, the control device 12 controls the gripping tip portions 11*l* so as to be moved apart, thereby releasing the temperature measurement tool 50, and returning the temperature measurement tool 50 to the work tool rack 13.

Figure 13:
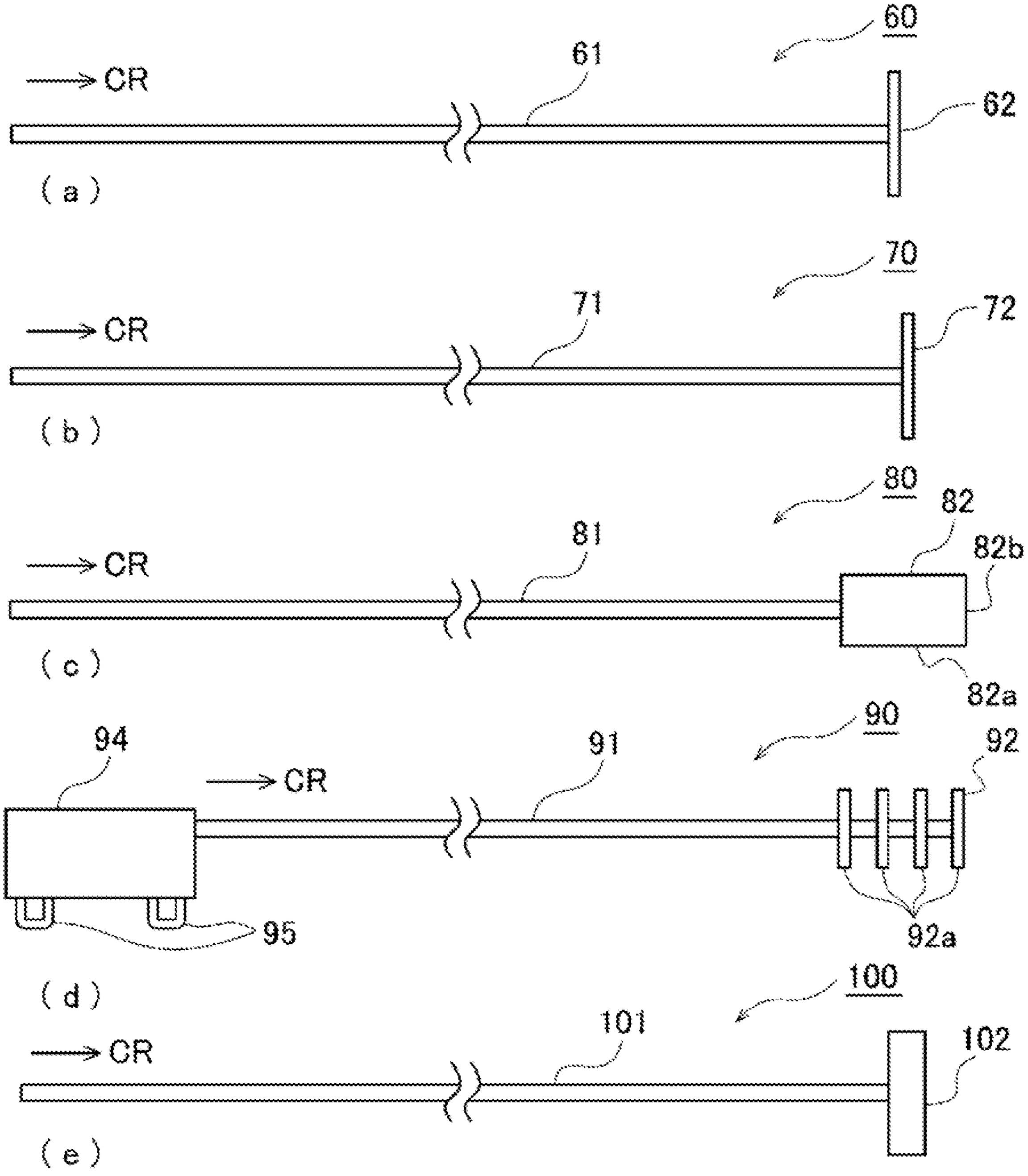
FIG. 13(*a*) to (*e*) are respectively side views of first to fifth slag removal tools in the above-mentioned melting work device.

Next, the first to fifth slag removal tools (slag removal tools) 60, 70, 80, 90, and 100 will be explained. FIG. 13(*a*), (*b*), (*c*), (*d*), and (*e*) are respectively side views of the first to fifth slag removal tools 60, 70, 80, 90, and 100 of the melting work device 10. The first to fifth slag removal tools 60, 70, 80, 90, and 100 comprise rods 61, 71, 81, 91, and 101, and slag removal portions 62, 72, 82, 92, and 102 provided on the tips of the rods 61, 71, 81, 91, and 101. The melting work device 10 uses the first to fifth slag removal tools 60, 70, 80, 90, and 100 to remove slag floating on the melt surface B of the melt.

Figure 14:
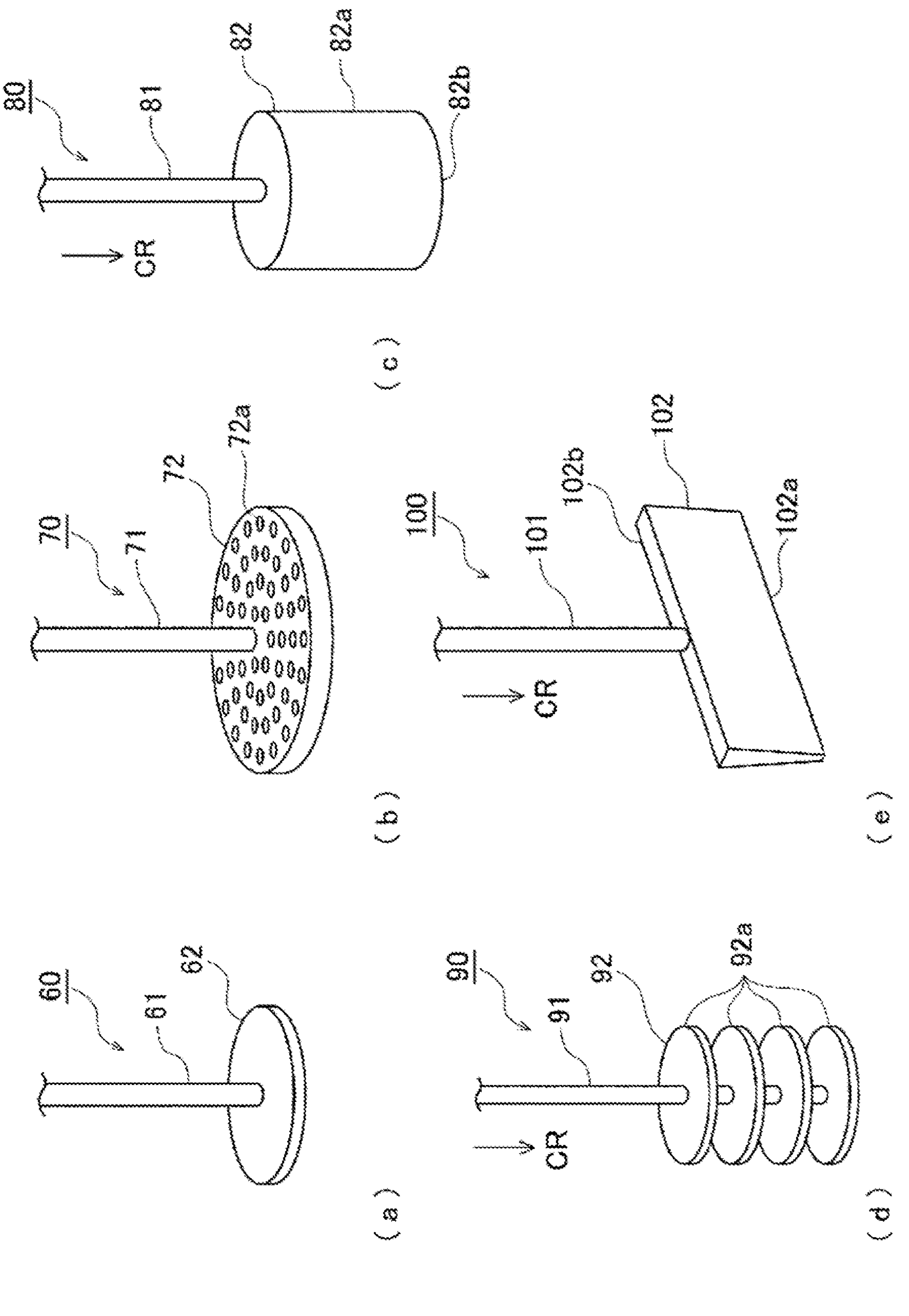
FIG. 14(*a*) to (*e*) are respectively perspective views of slag removal portions of the above-mentioned first to fifth slag removal tools.

First, the first and second slag removal tools 60 and 70 will be explained. FIGS. 14(*a*) and (*b*) are respectively perspective views of the slag removal portions 62 and 72 of the first and second slag removal tools 60 and 70.

These slag removal portions 62 and 72 are both formed so as to be disc-shaped, with the rods 61 and 71 connected to substantially the centers of the discs so as to perpendicularly intersect the slag removal portions 62 and 72.

On the slag removal portion 72 of the second slag removal tool 70, in particular, multiple holes 72*a* are formed.

Figure 15:
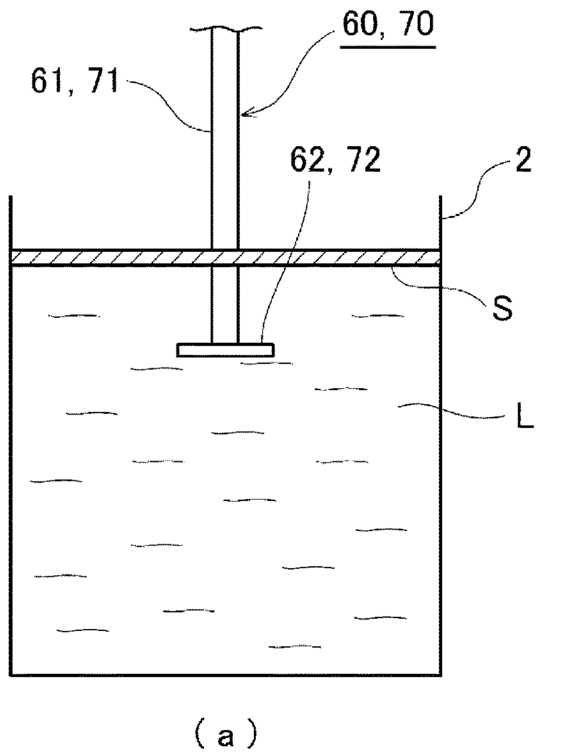
FIG. 15 is a diagram for explaining slag removal using the above-mentioned first and second slag removal tools.

FIG. 15 is a diagram for explaining slag removal using the first and second slag removal tools 60 and 70.

The melting work device 10 moves the first and second slag removal tools 60 and 70 in an arbitrary direction, including the up-down direction, at an arbitrary location above the melting furnace 2.

More specifically, the control device 12 controls the drive mechanism 11 so that, with the rods 61 and 71 of the first and second slag removal tools 60 and 70 positioned between the notches 11*n* in the opposing gripping tip portions 11*l* of the gripping portions 11*j* of the drive mechanism 11, the gripping tip portions 11*l* are brought close to each other, thereby gripping the rods 61 and 71. The control device 12 controls the drive mechanism 11 so that, as illustrated in FIG. 15(*a*), with the slag removal portions 62 and 72 facing downward, the first and second slag removal tools 60 and 70 are moved and positioned at an arbitrary location above the melting furnace 2, and thereafter lowered towards the melt in the melting furnace 2.

In this case, the control device 12 controls the drive mechanism 11 so that at least the entire slag removal portions 62 and 72 are lowered to a position below the height position of the melt surface B of the melt L measured beforehand by the melt surface detection tool 30.

Thereafter, as illustrated in FIG. 15(*b*), the control device 12 controls the drive mechanism 11 so that the first and second slag removal tools 60 and 70 are raised. At this time, the slag S floating on the melt surface B of the melt L is scooped up by the upper surfaces of the slag removal portions 62 and 72.

With the slag S riding on the upper surfaces of the slag removal portions 62 and 72, the control device 12 controls the drive mechanism 11 so that the first and second slag removal tools 60 and 70 are moved near the slag disposal box 3 illustrated in FIG. 1, and the slag S is discarded into the slag disposal box 3.

The control device 12 repeatedly performs this series of slag removal operations at different horizontal positions above the melting furnace 2.

After the slag S has been discarded, the control device 12 controls the drive mechanism 11 so that the first and second slag removal tools 60 and 70 are moved near the work tool rack 13, and positioned with the rods 61 and 71 lying horizontally at prescribed positions on the work tool rack 13. Thereafter, the control device 12 controls the gripping tip portions 11*l* so as to be moved apart, thereby releasing the first and second slag removal tools 60 and 70, and returning the first and second slag removal tools 60 and 70 to the work tool rack 13.

Next, the third slag removal tool 80 will be explained. FIG. 14(*c*) is a perspective view of the slag removal portion 82 of the third slag removal tool 80.

The slag removal portion 82 has a prescribed length in the axial direction CR of the rod 81, and comprises a slag adhesion portion 82*a* around the axis. More specifically, the slag removal portion 82 has a cylindrical shape that extends for a prescribed length in the axial direction CR of the rod 81. As will be explained next, the side surface 82*a* of the cylindrical shape and the bottom surface 82*b* on the side opposite to the rod 81 function as slag adhesion portions 82*a* and 82*b* to which slag adheres.

Figure 16:
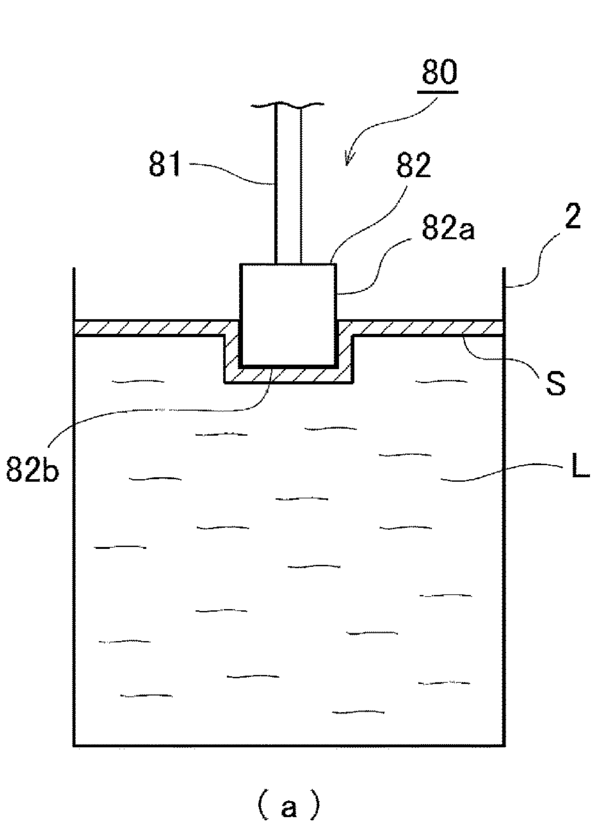
FIG. 16 is a diagram for explaining slag removal using the above-mentioned third slag removal tool.

FIG. 16 is a diagram for explaining slag removal using the third slag removal tool 80.

The melting work device 10 moves the third slag removal tool 80 in an arbitrary direction, including the up-down direction, at an arbitrary location above the melting furnace 2.

More specifically, the control device 12 controls the drive mechanism 11 so that, with the rod 81 of the third slag removal tool 80 positioned between the notches 11*n* in the opposing gripping tip portions 11*l* of the gripping portions 11*j* of the drive mechanism 11, the gripping tip portions 11*l* are brought close to each other, thereby gripping the rod 81. The control device 12 controls the drive mechanism 11 so that, as illustrated in FIG. 16(*a*), with the slag removal portion 82 facing downward, the third slag removal tool 80 is moved in the horizontal direction and positioned at an arbitrary location above the melting furnace 2, and thereafter lowered towards the melt in the melting furnace 2.

In this case, the control device 12 controls the drive mechanism 11 so that at least the bottom surface 82*b* of the slag removal portion 82 is lowered to a position below the height position of the melt surface B of the melt L measured beforehand by the melt surface detection tool 30.

Thereafter, as illustrated in FIG. 16(*b*), the control device 12 controls the drive mechanism 11 so that the third slag removal tool 80 is raised. At this time, the slag S floating on the melt surface B of the melt L adheres to the side surface 82*a* and the bottom surface 82*b* of the slag removal portion 82 and is discharged from the melting furnace 2.

With the slag S adhered to the slag removal portion 82, the control device 12 controls the drive mechanism 11 so that the third slag removal tool 80 is moved near the slag disposal box 3 illustrated in FIG. 1, and the slag S is discarded into the slag disposal box 3.

The control device 12 repeatedly performs this series of slag removal operations at different horizontal positions above the melting furnace 2.

After the slag S has been discarded, the control device 12 controls the drive mechanism 11 so that the third slag removal tool 80 is moved near the work tool rack 13, and positioned with the rod 81 lying horizontally at a prescribed position on the work tool rack 13. Thereafter, the control device 12 controls the gripping tip portions 11*l* so as to be moved apart, thereby releasing the third slag removal tool 80, and returning the third slag removal tool 80 to the work tool rack 13.

Next, the fourth slag removal tool 90 will be explained. FIG. 14(*d*) is a perspective view of the slag removal portion 92 of the fourth slag removal tool 90.

The slag removal portion 92 has a prescribed length in the axial direction CR of the rod 91, and comprises a slag adhesion portion 92*a* around the axis. More specifically, the slag removal portion 92 is formed by providing a plurality of discs 92*a* that are spaced from each other over a prescribed length in the axial direction CR of the rod 91. As will be explained below, the plurality of discs 92*a* function as slag adhesion portions 92*a* to which slag adheres. In FIG. 14(*d*), four discs 92*a* are illustrated, but the number of discs 92*a* may be appropriately selected from within a range, for example, of at least two and at most twenty.

On the fourth slag removal tool 90, a drive portion 94 is provided on the end of the rod 91 opposite to the end on which the slag removal portion 92 is provided, as illustrated in FIG. 13(*d*). The drive portion 94 is able to axially rotate the rod 91.

The drive portion 94 is provided with two grip portions 95 that are separated by a distance that is approximately the same as the spacing between two gripping portions 11*j* of the drive mechanism 11. The grip portions 95 are formed, for example, by joining, to the drive portion 94, the tips on both bent ends of a steel rod that is bent on both ends. As a result thereof, the structure is such that the drive portion 94 can be fixed to the drive mechanism 11 by having the two gripping portions 11*j* of the drive mechanism 11 respectively grip these grip portions 95.

Figure 17:
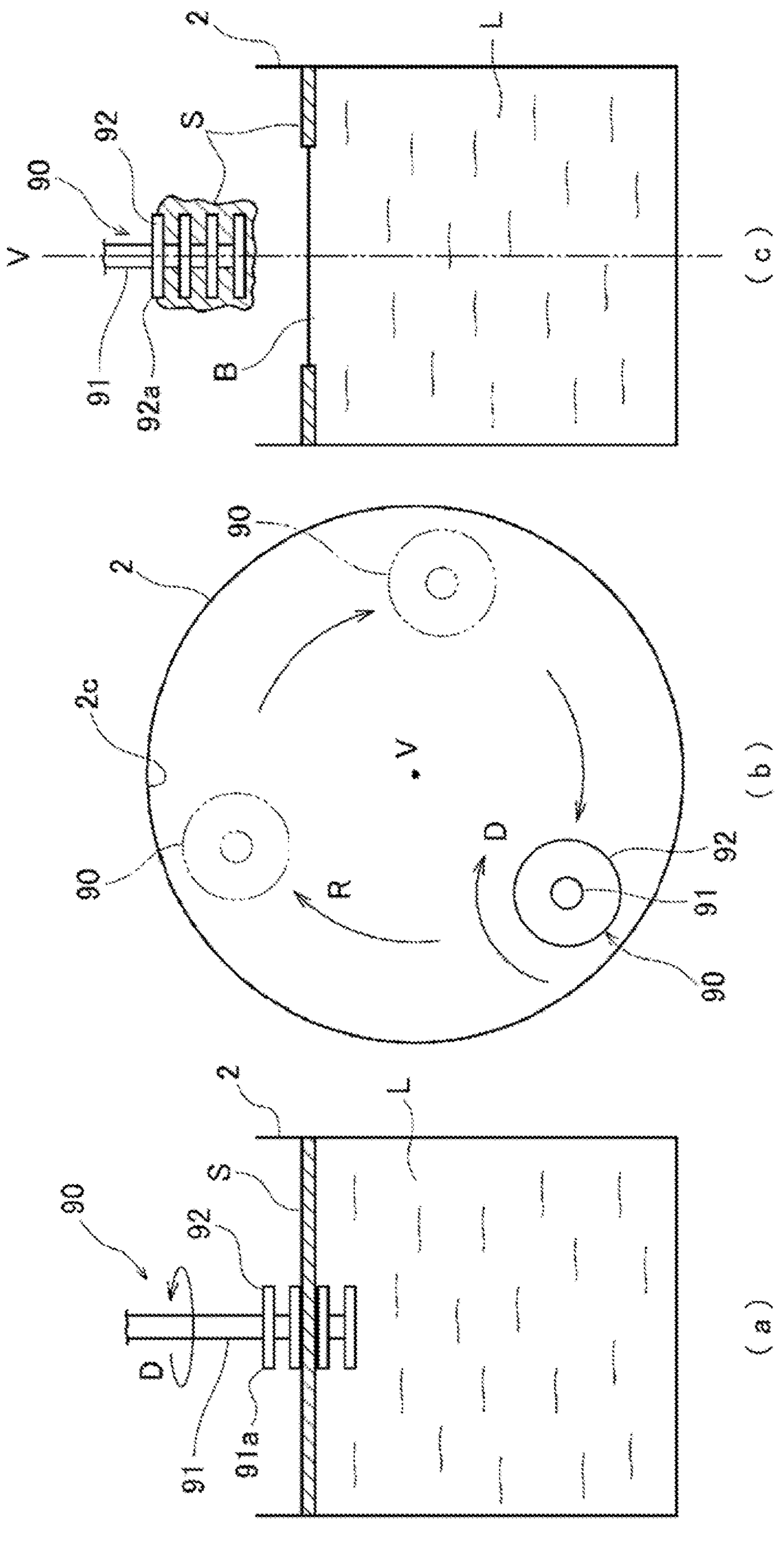
FIG. 17 is a diagram for explaining slag removal using the above-mentioned fourth slag removal tool.

FIG. 17 is a diagram for explaining slag removal using the fourth slag removal tool 90.

The melting work device 10 moves the fourth slag removal tool 90 in an arbitrary direction, including the up-down direction, at an arbitrary location above the melting furnace 2.

More specifically, the control device 12 controls the drive mechanism 11 so that, with the grip portions 95 provided on the drive portion 94 of the fourth slag removal tool 90 positioned between the notches 11*n* in the opposing gripping tip portions 11*l* of the gripping portions 11*j* of the drive mechanism 11, the gripping tip portions 11*l* are brought close to each other, thereby gripping the grip portions 95. Next, the control device 12 controls the drive mechanism 11 so that, as illustrated in FIG. 17(*a*), with the slag removal portion 92 facing downward, the fourth slag removal tool 90 is moved and positioned at an arbitrary location above the melting furnace 2, and thereafter lowered towards the melt in the melting furnace 2 with the drive portion 94 in an operating state.

In this case, the control device 12 controls the drive mechanism 11 so that at least the tip of the slag removal portion 92 is lowered to a position below the height position of the melt surface B of the melt L measured beforehand by the melt surface detection tool 30.

In this state, the drive portion 94 is operating, so the rod 91 is rotating. FIG. 17(*b*) illustrates how, as the rod 91 rotates, the slag removal portion 92, in the present embodiment, rotates clockwise, in the direction D.

When the drive portion 94 rotates the rod 91 in this way, the drive mechanism 11 is controlled by the control device 12 so that the fourth slag removal tool 90 revolves about an imaginary axis V extending in the up-down direction and set to be in the approximate center of the melting furnace 2, in a revolution direction R that is the same as the rotation direction D of the rod 91, while maintaining the height position of the slag removal portion 92.

Due to the rotation of the slag removal portion 92 and the revolution of the fourth slag removal tool 90, the slag S floating on the melt surface B of the melt L positioned in the vicinity of the path over which the slag removal portion 92 moves is wound onto the slag removal portion 92.

Thereafter, as illustrated in FIG. 17(*c*), the control device 12 controls the drive mechanism 11 so that the fourth slag removal tool 90 is raised. As a result thereof, the slag S wound onto the slag removal portion 92 is discharged from the melting furnace 2.

With the slag S adhered to the slag removal portion 92, the control device 12 controls the drive mechanism 11 so that the fourth slag removal tool 90 is moved near the slag disposal box 3 illustrated in FIG. 1, and the slag S is discarded into the slag disposal box 3.

The control device 12 repeatedly performs this series of slag removal operations an appropriate number of times.

After the slag S has been discarded, the control device 12 controls the drive mechanism 11 so that the fourth slag removal tool 90 is moved near the work tool rack 13, and positioned with the rod 91 lying horizontally at a prescribed position on the work tool rack 13. Thereafter, the control device 12 controls the gripping tip portions 11*l* so as to be moved apart, thereby releasing the fourth slag removal tool 90, and returning the fourth slag removal tool 90 to the work tool rack 13.

Next, the fifth slag removal tool 100 will be explained. FIG. 14(*e*) is a perspective view of the slag removal portion 102 of the fifth slag removal tool 100.

The slag removal portion 102 has a rectangular shape, and is provided so that the width direction of this rectangular shape is aligned with the axial direction CR of the rod 101, and the rod 101 is joined to one of the long sides 102*b*. The other long side 102*a* is positioned on the side opposite to the rod 101.

Figure 18:
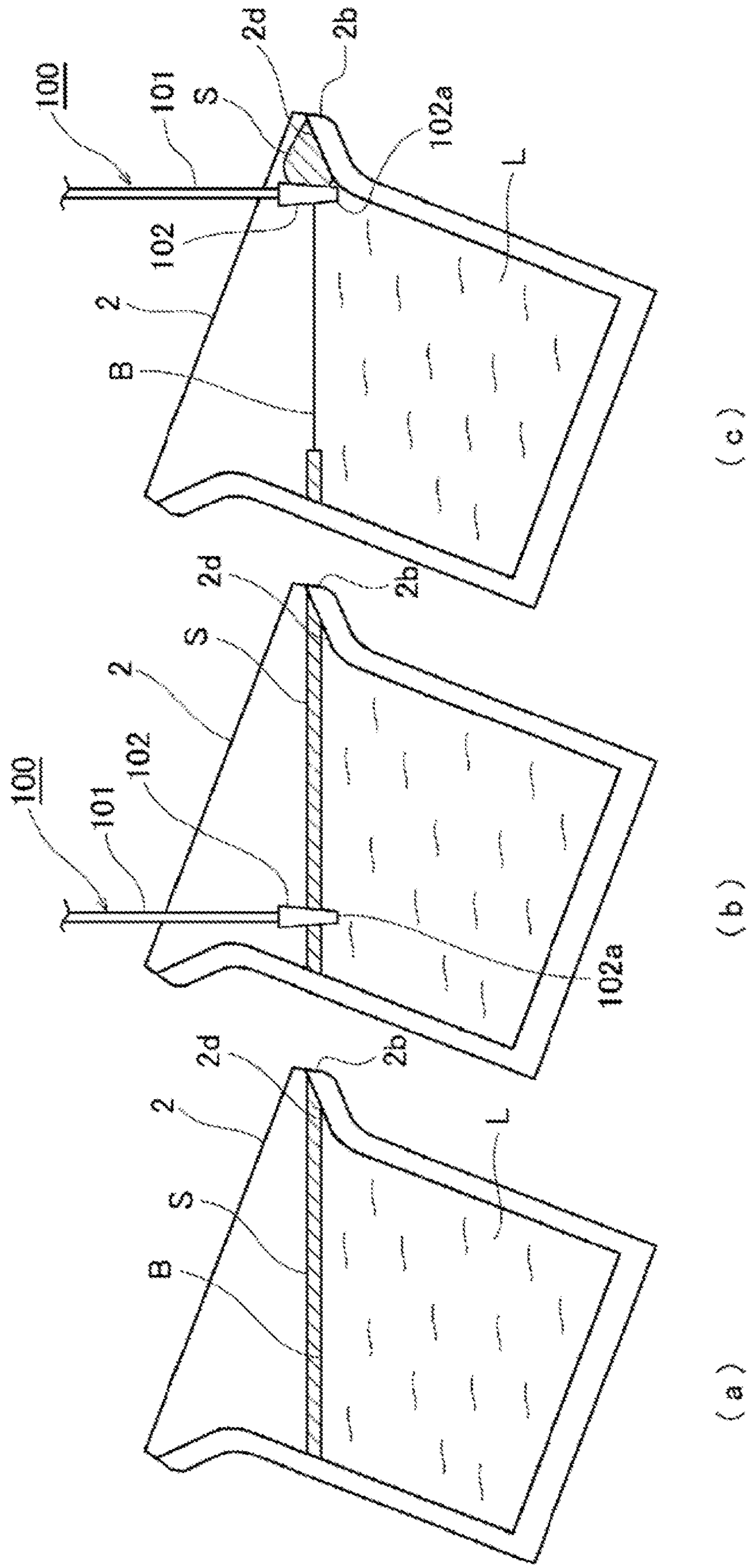
FIG. 18 is a diagram for explaining slag removal using the above-mentioned fifth slag removal tool.

FIG. 18 is a diagram for explaining slag removal using the fifth slag removal tool 100.

Before slag is removed by the fifth slag removal tool 100, the tilting device of the melting furnace 2 is operated so that, as illustrated in FIG. 18(*a*), the melting furnace 2 is tilted in the direction of the slag outlet 2*b*, and the melt surface B or the slag S is positioned over a tilted portion 2*d* of the slag outlet 2*b*.

In this case, the melting furnace 2 is tilted, so the height of the melt surface B may be a value that is different from the height measured when the melting furnace 2 is not tilted, as explained by using the drawings in FIG. 9. For this reason, it is desirable for the height position of the melt surface B of the melt L to be detected, in the manner that has already been explained, with the melting furnace 2 in the tilted state.

Next, the control device 12 controls the drive mechanism 11 so that, with the rod 101 of the fifth slag removal tool 100 positioned between the notches 11*n* in the opposing gripping tip portions 11*l* of the gripping portions 11*j* of the drive mechanism 11, the gripping tip portions 11*l* are brought close to each other, thereby gripping the rod 101. The control device 12 controls the drive mechanism 11 so that, as illustrated in FIG. 18(*b*), with the slag removal portion 102 facing downward, the fifth slag removal tool 100 is moved and positioned above the melting furnace 2 near the melt outlet 2*a* located on the side of the melting furnace 2 opposite to the slag outlet 2*b*, and thereafter lowered towards the melt in the melting furnace 2.

Thereafter, as illustrated in FIG. 18(*c*), the control device 12 controls the drive mechanism 11 so that the fifth slag removal tool 100 is moved in the horizontal direction towards the slag outlet 2*b* of the melting furnace 2. As a result thereof, the slag S floating on the melt surface B of the melt L is pushed towards the tilted portion 2*d*.

When the long side 102*a* located on the lower side of the slag removal portion 102 comes into contact with the tilted portion 2*d* of the slag outlet 2*b*, the slag S that has been pushed together is collected between the side surface of the slag removal portion 102 and the tilted portion 2*d*. In this case, the control device 12 controls the drive mechanism 11 so that the fifth slag removal tool 100 moves in the upward and horizontal directions along the slope of the tilted portion 2*d*, and the collected slag S is discharged from the slag outlet 2*b* to the outside of the melting furnace 2.

After the slag S has been discarded, the control device 12 controls the drive mechanism 11 so that the fifth slag removal tool 100 is moved near the work tool rack 13, and positioned with the rod 101 lying horizontally at a prescribed position on the work tool rack 13. Thereafter, the control device 12 controls the gripping tip portions 11*l* so as to be moved apart, thereby releasing the fifth slag removal tool 100, and returning the fifth slag removal tool 100 to the work tool rack 13.

Figure 19:
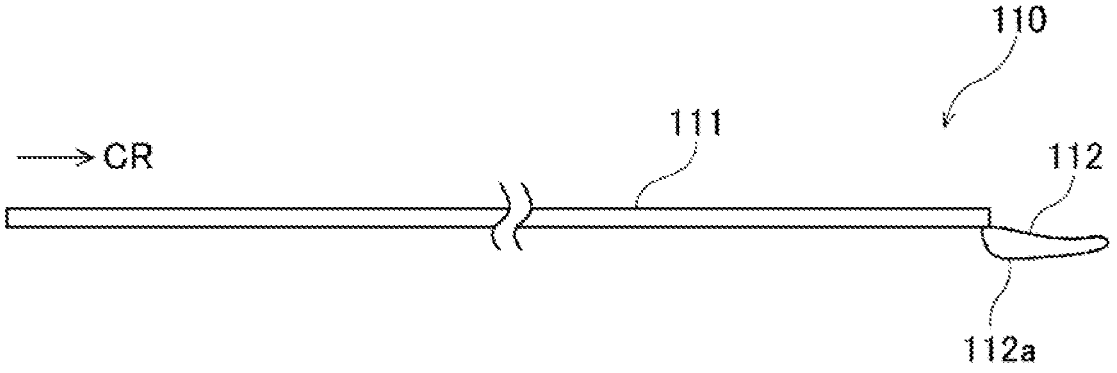
FIG. 19 is a side view of an auxiliary material charging tool in the above-mentioned melting work device.

Next, the auxiliary material charging tool 110 will be explained. FIG. 19 is a side view of an auxiliary material charging tool 110 in the melting work device 10. The auxiliary material charging tool 110 comprises a rod 111, and an auxiliary material loading portion 112 that is provided at the tip of the rod 111 and on which an auxiliary material can be loaded. The melting work device 10 uses the auxiliary material charging tool 110 to charge, into the melting furnace 2, the auxiliary material for adjusting the components in the melt.

The auxiliary material loading portion 112 is, for example, a plate material comprising a recess 112*a*, like the tip of a shovel. The auxiliary material loading portion 112 is provided so that the direction in which the recess 112*a* is recessed perpendicularly intersects the axial direction CR of the rod 111.

The control device 12 controls the drive mechanism 11 so that, with the rod 111 of the auxiliary material charging tool 110 positioned between the notches 11*n* in the opposing gripping tip portions 11*l* of the gripping portions 11*j* of the drive mechanism 11, the gripping tip portions 11*l* are brought close to each other, thereby gripping the rod 111. The control device 12 controls the drive mechanism 11 so that the auxiliary material loading portion 112 is moved near the auxiliary material weighing machine 16 illustrated in FIG. 1 while the auxiliary material charging tool 110 is held in an orientation in which the rod 111 is substantially horizontal, and a fixed amount of the auxiliary material is automatically weighed and discharged from the auxiliary material weighing machine 16 into the recess 112*a*.

In this state, the control device 12 controls the drive mechanism 11 so that the auxiliary material loading portion 112 is moved and positioned above the melting furnace 2, and the rod 111 is tilted to charge, into the melt L in the melting furnace 2, the auxiliary material in the recess 112*a*.

After the auxiliary material has been charged, the control device 12 controls the drive mechanism 11 so that the auxiliary material charging tool 110 is moved near the work tool rack 13, and positioned with the rod 111 lying horizontally at a prescribed position on the work tool rack 13. Thereafter, the control device 12 controls the gripping tip portions 11*l* so as to be moved apart, thereby releasing the auxiliary material charging tool 110, and returning the auxiliary material charging tool 110 to the work tool rack 13.

Next, a method for melting metal using the melting equipment 1 will be explained.

First, metal that is to be melted, from a scrapyard or the like, is transported and charged into the melting furnace 2.

Thereafter, the metal is melted by means of the melting furnace 2.

As the melting of the metal progresses, the melting work device 10 that has already been explained is used to perform melting work in accordance with the melting work method explained below.

In the present embodiment, the melting work includes detecting the height position of the melt surface of the melt, measuring the temperature of the melt, removing slag, charging auxiliary materials, and sampling.

Of these types of work, the detection of the height position of the melt surface of the melt is performed first. Thereafter, sampling, slag removal, charging of auxiliary material, and measurement of the temperature of the melt are performed, generally in the stated order, but out of order as needed.

When the metal is melted, the melting furnace 2 is tilted in the direction of the melt outlet 2*a* by means of the tilting device, and the melt is discharged.

Figure 20:
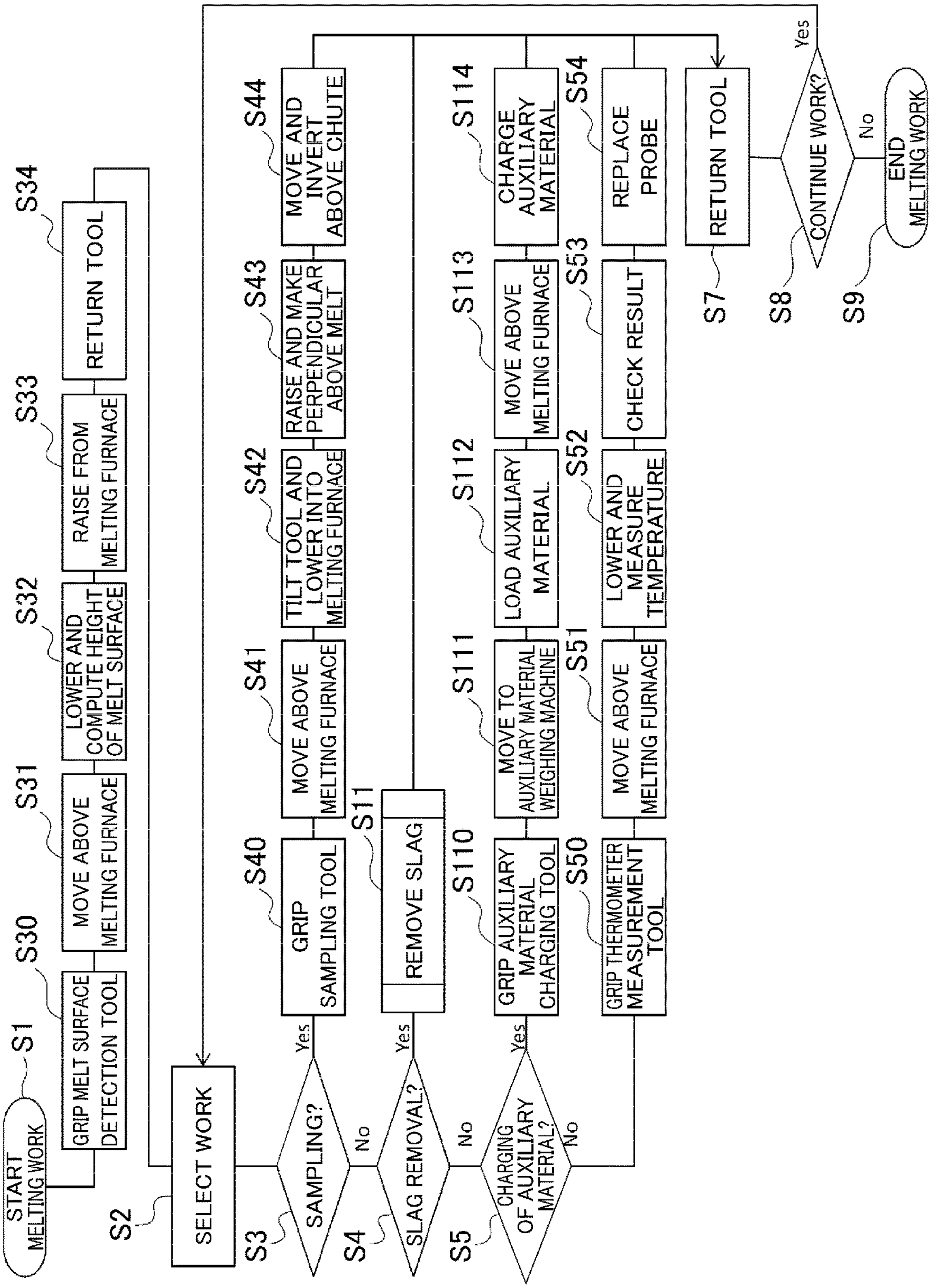
FIG. 20 is a flow chart for explaining a melting work method using the above-mentioned melting work device.

Next, the melting work method using the melting work device 10 will be explained. FIG. 20 is a flow chart explaining the melting work method.

The melting work method in the present embodiment is for performing work on a melt obtained by melting a material in the melting furnace, wherein an arbitrary work tool among the plurality of work tools is fixed to the drive mechanism, the work tool is lowered at an arbitrary location above the melting furnace by means of the drive mechanism, and after being moved to an arbitrary location, the work tool is raised by the drive mechanism.

When the melting work is started (step S1) by an instruction or the like from a worker, the height position of the melt surface of the melt is first detected.

The control device 12 controls the drive mechanism 11 so that the wrist portion 11*h* of the drive mechanism 11 is moved above the work tool rack 13, and the melt surface detection tool 30 is gripped (step S30).

Next, the control device 12 controls the drive mechanism 11 so that the tips of the first electrode 33 and the second electrode 34 protruding from the rod 31 face downwards, and the melt surface detection tool 30 is moved and positioned at an arbitrary location above the melting furnace 2 (step S31).

Thereafter, the control device 12 controls the drive mechanism 11 so that the melt surface detection tool 30 is lowered towards the melt in the melting furnace 2. When the first electrode 33 comes into contact with the surface of the slag S and the melt surface detection tool 30 is moved further downward, the tip of the first electrode 33 easily breaks the layer of slag S and the melt surface B is exposed to the outside air.

When the control device 12 controls the drive mechanism 11 so that the melt surface detection tool 30 is moved further downward, the tip of the second electrode 34 contacts the exposed melt surface B, and an electric current flows between the first electrode 33 and the second electrode 34. The control device 12 detects this electric current, computes the positions of the tips of the first electrode 33 and the second electrode 34 at this time based on the state of the drive mechanism 11 or the like at this time, and detects and stores the height position of the melt surface B of the melt L (step S32).

Thus, in the melting work method of the present embodiment, the melt surface detection tool 30 is fixed to the drive mechanism 11, and the melt surface detection tool 30 is lowered by means of the drive mechanism 11 to detect the height position of the melt surface B.

After the height position of the melt surface B of the melt L has been detected, the control device 12 controls the drive mechanism 11 so that the melt surface detection tool 30 is raised (step S33).

The control device 12 controls the drive mechanism 11 so that the melt surface detection tool 30 is moved near the work tool rack 13, and positioned with the rod 31 lying horizontally at a prescribed position above the work tool rack 13. Thereafter, the control device 12 controls the gripping tip portions 11*l* so as to be moved apart, thereby releasing the melt surface detection tool 30, and returning the melt surface detection tool 30 to the work tool rack 13 (step S34).

Next, the worker or the control device 12 selects work to be performed next from among sampling, slag removal, charging of auxiliary material, and measurement of the temperature of the melt (step S2).

First, the control device 12 determines whether or not the selected work is sampling (step S3). If the selected work is sampling (Yes in step S3), then the procedure advances to step S40, which will be explained next. If it is not sampling (No in step S3), then the procedure advances to step S4, which will be explained below.

If the selected work is sampling, then the control device 12 controls the drive mechanism 11 so that the wrist portion 11*h* of the drive mechanism 11 is moved above the work tool rack 13, and the sampling tool 40 is gripped (step S40).

The control device 12 controls the drive mechanism 11 so that, with the sample-making portion 42 facing downward, the sampling tool 40 is moved and positioned at an arbitrary location above the melting furnace 2 (step S41), and thereafter, the sampling tool 40 is tilted with respect to the vertical direction, and lowered towards the melt in the melting furnace 2 (step S42).

Thereafter, the control device 12 controls the drive mechanism 11 so that the sampling tool 40 is raised and the melt L is scooped up in the recess 42*a*. At this time, the control device 12 controls the drive mechanism 11 so that the sampling tool 40 is raised with the rod 41 remaining in a tilted state relative to the vertical direction. Thereafter, the angle of the sampling tool 40 is made perpendicular, and the melt surface of the melt L in the recess 42*a* is made substantially parallel to the upper surface 42*d* (step S43).

The sample-making portion 42 is made of a material with high thermal conductivity, and in the present embodiment, the melt L is casting steel having a high solidification temperature, so the melt L that has been scooped up immediately cools and solidifies.

In this state, the control device 12 controls the drive mechanism 11 so that the sampling tool 40 is moved near the chute 17. Thereafter, the control device 12 controls the drive mechanism 11 so that the sampling tool 40 is inverted in the up-down direction and the upper surface 42*d* of the sample-making portion 42 is positioned facing downward directly above one end 17*a* of the chute 17 located on the side towards the melting furnace 2. Then, the metal is dropped onto the one end 17*a* of the chute 17 (step S44).

Thus, in the melting work method of the present embodiment, the sampling tool 40 is fixed to the drive mechanism 11, and the sampling tool 40 is lowered by means of the drive mechanism 11 to scoop up the melt.

Thereafter, the procedure advances to step S7, which will be explained below.

Figure 21:
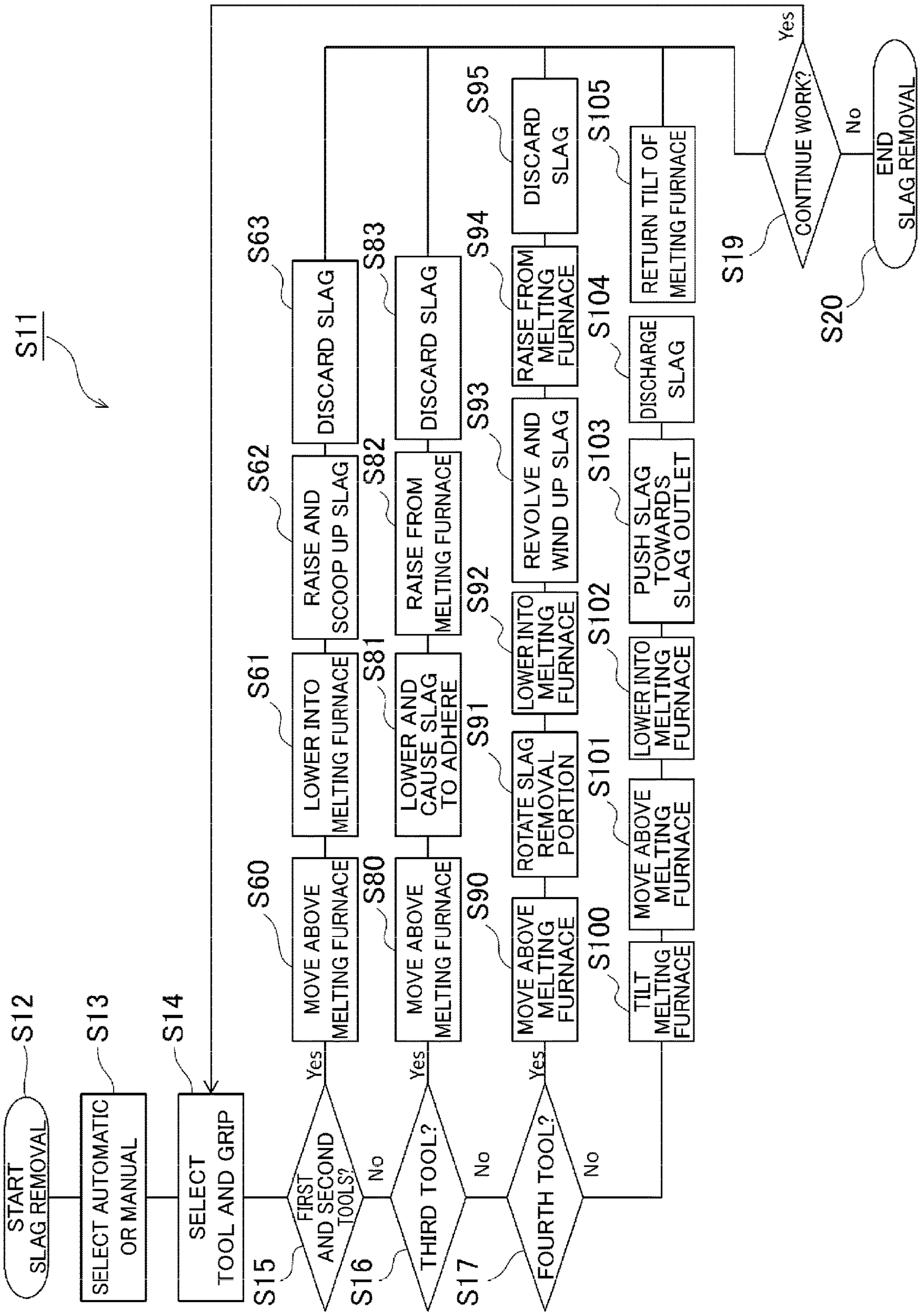
FIG. 21 is a flow chart for explaining a slag removal method in the above-mentioned melting work method.

If the selected work is not sampling, then the control device 12 determines whether or not the selected work is slag removal (step S4). If the selected work is slag removal (Yes in step S4), then the procedure advances to step S11, which will be explained next. If it is not slag removal (No in step S4), then the procedure advances to step S5, which will be explained below. FIG. 21 is a flow chart explaining the slag removal method (step S11).

In the slag removal method in the present embodiment, a slag removal tool is fixed to the drive mechanism, the slag removal tool is lowered at an arbitrary location above the melting furnace by means of the drive mechanism, and after the slag removal portion has been plunged to a prescribed depth into the melt, the slag removal tool is raised by the drive mechanism.

When slag removal is started (step S12), the worker uses the control device 12 to select whether or not the slag removal work is to be performed automatically, i.e., whether the control device 12 is to automatically control the drive mechanism 11 by means of a program prepared by teaching, or the worker is to remotely operate the drive mechanism 11 by means of the input device 20 and the control device 12 (step S13). As already explained, in the following explanation, in both cases, it will be described that the control device 12 is controlling the drive mechanism 11.

If automatic control is selected in step S13, then the work is basically performed automatically until the slag removal work is finished. However, the worker may temporarily remotely operate the drive mechanism 11 by means of the control device 12 when, for example, the slag S is located in an area from which it is difficult to remove by automatic control. Conversely, when remote operation is selected, it may be switched to automatic control if the worker determines that the work may be relegated to automatic control.

Next, the worker uses the control device 12 to select and grip a tool to be used for slag removal (step S14). In other words, the worker selects to use one of the first to fifth slag removal tools (slag removal tools) 60, 70, 80, 90, and 100, and on the basis thereof, the control device 12 controls the drive mechanism 11 so that the wrist portion 11*h* of the drive mechanism 11 is made to horizontally move above the work tool rack 13 and grip the slag removal tool 60, 70, 80, 90, or 100 that has been indicated.

Next, the control device 12 determines whether or not the selected slag removal tool is the first and second slag removal tools 60 and 70 (step S15). If the selected slag removal tool is the first and second slag removal tools 60 and 70 (Yes in step S15), then the procedure advances to step S60, which will be explained next. If it is not the first and second slag removal tools 60 and 70 (No in step S15), then the procedure advances to step S16, which will be explained below.

If the selected slag removal tool is the first and second slag removal tools 60 and 70, then the control device 12 controls the drive mechanism 11 so that, with the slag removal portions 62 and 72 facing downward, the first and second slag removal tools 60 and 70 are moved and positioned at an arbitrary location above the melting furnace 2 (step S60), and thereafter lowered towards the melt in the melting furnace 2 (step S61).

Thereafter, the control device 12 controls the drive mechanism 11 so that the first and second slag removal tools 60 and 70 are raised. At this time, the slag S floating on the melt surface B of the melt L is scooped up by the upper surfaces of the slag removal portions 62 and 72 (step S62).

With the slag S riding on the upper surfaces of the slag removal portions 62 and 72, the control device 12 controls the drive mechanism 11 so that the first and second slag removal tools 60 and 70 are moved near the slag disposal box 3, and the slag S is discarded into the slag disposal box 3 (step S63).

Thereafter, the procedure advances to step S19, which will be explained below.

If the selected slag removal tool is not the first and second slag removal tools 60 and 70, then the control device 12 determines whether or not the selected slag removal tool is the third slag removal tool 80 (step S16). If the selected slag removal tool is the third slag removal tool 80 (Yes in step S16), then the procedure advances to step S80, which will be explained next. If it is not the third slag removal tool 80 (No in step S16), then the procedure advances to step S17, which will be explained below.

If the selected slag removal tool is the third slag removal tool 80, then the control device 12 controls the drive mechanism 11 so that, with the slag removal portion 82 facing downward, the third slag removal tool 80 is moved and positioned at an arbitrary location above the melting furnace 2 (step S80), and thereafter lowered towards the melt in the melting furnace 2 (step S81). At this time, the slag S floating on the melt surface B of the melt L adheres to the side surface 82*a* and the bottom surface 82*b* of the slag removal portion 82.

Thereafter, the control device 12 controls the drive mechanism 11 so that the third slag removal tool 80 is raised (step S82). With the slag S adhered to the slag removal portion 82, the control device 12 controls the drive mechanism 11 so that the third slag removal tool 80 is moved near the slag disposal box 3, and the slag S is discarded into the slag disposal box 3 (step S83).

Thereafter, the procedure advances to step S19, which will be explained below.

If the selected slag removal tool is not the third slag removal tool 80, then the control device 12 determines whether or not the selected slag removal tool is the fourth slag removal tool 90 (step S17). If the selected slag removal tool is the fourth slag removal tool 90 (Yes in step S17), then the procedure advances to step S90, which will be explained next. If it is not the fourth slag removal tool 90 (No in step S17), then the procedure advances to step S100, which will be explained below.

If the selected slag removal tool is the fourth slag removal tool 90, then the control device 12 controls the drive mechanism 11 so that, with the slag removal portion 92 facing downward, the fourth slag removal tool 90 is moved and positioned at an arbitrary location above the melting furnace 2 (step S90), and thereafter, with the drive portion 94 operating and the slag removal portion 92 rotating (step S91), the fourth slag removal tool 90 is lowered towards the melt in the melting furnace 2 (step S92).

In this state, the drive portion 94 is operating, so the rod 91 is rotating. When the drive portion 94 rotates the rod 91, the control device 12 controls the drive mechanism 11 so that the fourth slag removal tool 90 revolves about an imaginary axis V extending in the up-down direction and set to be in the approximate center of the melting furnace 2, in a revolution direction R that is the same as the rotation direction D of the rod 91, while maintaining the height position of the slag removal portion 92.

Due to the rotation of the slag removal portion 92 and the revolution of the fourth slag removal tool 90, the slag S floating on the melt surface B of the melt L positioned in the vicinity of the path over which the slag removal portion 92 moves is wound onto the slag removal portion 92 (step S93).

Then, the control device 12 controls the drive mechanism 11 so that the fourth slag removal tool 90 is raised (step S94). With the slag S adhered to the slag removal portion 92, the control device 12 controls the drive mechanism 11 so that the fourth slag removal tool 90 is moved near the slag disposal box 3, and the slag S is discarded into the slag disposal box 3 (step S95).

Thereafter, the procedure advances to step S19, which will be explained below.

If the selected slag removal tool is not the fourth slag removal tool 90, then the control device 12 determines that the selected slag removal tool is the fifth slag removal tool 100.

In this case, the tilting device of the melting furnace 2 is first operated so that the melting furnace 2 is tilted in the direction of the slag outlet 2*b*, and the melt surface B or the slag S is positioned over the tilted portion 2*d* of the slag outlet 2*b* (step S100).

Since the melting furnace 2 is tilted, the height of the melt surface B may be a value that is different from the height measured when the melting furnace 2 is not tilted, as explained by using the drawings in FIG. 9. For this reason, it is desirable for the height position of the melt surface B of the melt L to be detected again by performing steps S30 to S34, which have already been explained, with the melting furnace 2 in the tilted state.

Next, the control device 12 controls the drive mechanism 11 so that, with the slag removal portion 102 facing downward, the fifth slag removal tool 100 is moved and positioned above the melting furnace 2 near the melt outlet 2*a* located on the side of the melting furnace 2 opposite to the slag outlet 2*b* (step S101), and the fifth slag removal tool 100 is thereafter lowered towards the melt in the melting furnace 2 (step S102).

Thereafter, the control device 12 controls the drive mechanism 11 so that the fifth slag removal tool 100 is moved in the horizontal direction towards the slag outlet 2*b* of the melting furnace 2. As a result thereof, the slag S floating on the melt surface B of the melt L is pushed towards the tilted portion 2*d* (step S103).

When the long side 102*a* located on the lower side of the slag removal portion 102 comes into contact with the tilted portion 2*d* of the slag outlet 2*b*, the slag S that has been pushed together is collected between the side surface of the slag removal portion 102 and the tilted portion 2*d*. In this case, the control device 12 controls the drive mechanism 11 so that the fifth slag removal tool 100 moves in the upward and horizontal directions along the slope of the tilted portion 2*d*, and the collected slag S is discharged from the slag outlet 2*b* to the outside of the melting furnace 2 (step S104).

Thereafter, the tilt of the melting furnace 2 is returned to the original state (step S105), and the procedure advances to step S19, which will be explained next.

Next, it is determined whether or not the slag removal work is to be continued (step S19). There is a possibility that the slag S has not been able to be adequately removed after performing the series of slag removal processes starting with the above-mentioned steps S60, S80, S90, and S100 just once. For example, if it is determined that the slag S has not been adequately removed (Yes in step S19), then the procedure returns to step S14 and the series of slag removal processes are performed once again, for example, at a different horizontal position on the melt surface B. At this time, a slag removal tool that has been used once may be returned to the work tool rack 13 and a different tool may be used.

If it is determined that there is no need to perform the series of slag removal processes again (No in step S19), then the slag removal process ends (step S20) and the procedure advances to step S7, shown in FIG. 20, which will be explained below.

If the selected work is not slag removal, then the control device 12 determines whether or not the selected work is the charging of auxiliary material (step S5). If the selected work is the charging of auxiliary material (Yes in step S5), then the procedure advances to step S110, which will be explained next. If it is not the charging of auxiliary material (No in step S5), then the procedure advances to step S50, which will be explained below.

If the selected work is the charging of auxiliary material, then the control device 12 controls the drive mechanism 11 so that the wrist portion 11*h* of the drive mechanism 11 is moved above the work tool rack 13 and the auxiliary material charging tool 110 is gripped (step S110).

The control device 12 controls the drive mechanism 11 so that the auxiliary material loading portion 112 is moved near the auxiliary material weighing machine 16 illustrated in FIG. 1 while the auxiliary material charging tool 110 is held in an orientation in which the rod 111 is substantially horizontal (step S111), and a fixed amount of the auxiliary material is automatically weighed and discharged from the auxiliary material weighing machine 16 into the recess 112*a* (step S112).

In this state, the control device 12 controls the drive mechanism 11 so that the auxiliary material loading portion 112 is moved and positioned above the melting furnace 2 (step S113), and the rod 111 is tilted to charge, into the melt L in the melting furnace 2, the auxiliary material in the recess 112*a* (step S114).

Thereafter, the procedure advances to step S7, which will be explained below.

If the selected work is not the charging of auxiliary material, then the control device 12 determines that the selected work is the measurement of the temperature of the melt.

In this case, the control device 12 controls the drive mechanism 11 so that the wrist portion 11*h* of the drive mechanism 11 is moved above the work tool rack 13 and the temperature measurement tool 50 is gripped (step S50).

The control device 12 controls the drive mechanism 11 so that, with the probe 52 facing downward, the temperature measurement tool 50 is moved and positioned at an arbitrary location above the melting furnace 2 (step S51), and thereafter lowered towards the melt in the melting furnace 2. As a result thereof, the temperature of the melt L is measured (step S52).

Thereafter, the control device 12 controls the drive mechanism 11 so that the temperature measurement tool 50 is raised and moved towards a worker. After a check of the melt temperature measurement results that are displayed on the thermometer body 51 by the worker has ended (step S53), the control device 12 controls the drive mechanism 11 so as to replace the probe (step S54).

Thereafter, the procedure advances to step S7, which will be explained next.

After the work using each of the work tools 14 described above has ended, the control device 12 controls the drive mechanism 11 so that the work tool 14 is moved near the work tool rack 13, and the work tool 14 is positioned so as to lie horizontally at a prescribed position above the work tool rack 13. Thereafter, the control device 12 controls the gripping tip portions 11*l* so as to be moved apart, thereby releasing the work tool 14, and returning the work tool 14 to the work tool rack 13 (step S7).

Next, it is determined whether or not the melting work is to be continued (step S8). If it is determined that the melting work is to be continued (Yes in step S8), then the procedure returns to step S2, and the series of processes starting with the selection of the work is performed again.

If it is determined that there is no need to continue the melting work (No in step S8), then the melting work ends (step S9).

Next, the effects of the above-mentioned melting work device and the melting work method will be explained.

The melting work device 10, which performs work on melt L obtained by melting a material in a melting furnace 2, comprises a drive mechanism 11, and a plurality of work tools 14 that are operated by the drive mechanism 11, wherein the drive mechanism 11 is able to move the work tools 14 in an arbitrary direction at an arbitrary location on the melting furnace 2.

Due to the above-mentioned feature, the melting work is performed by the drive mechanism 11, which is able to move the work tools 14 in an arbitrary direction at an arbitrary location above the melting furnace 2. Thus, regarding work for which a corresponding work tool 14 is provided, the worker basically does not need to approach the melting furnace 2. Additionally, the drive mechanism 11 comprises a plurality of work tools 14, so a plurality of types of furnace-front work can be performed. For this reason, work relating to melting furnaces can be easily performed.

Additionally, the plurality of work tools 14 comprise slag removal tools 60, 70, 80, 90, and 100 for removing slag S floating on the melt surface B of the melt L, and the slag removal tools 60, 70, 80, 90, and 100 comprise slag removal portions 62, 72, 82, 92, and 102 provided on the tips of the rods 61, 71, 81, 91, and 101.

According to the above-mentioned feature, the slag removal portions 62, 72, 82, 92, and 102 are provided on the tips of the rods 61, 71, 81, 91, and 101, resulting in structures that can more efficiently remove slag than cases in which a round bar is used.

Being able to efficiently remove slag means that a large amount of slag S can be removed each time a work tool 14 is placed in the melting furnace 2. In other words, the amount of slag that adheres is increased in comparison to round bars. In addition thereto, by providing slag removal portions 62, 72, 82, 92, and 102 on the tips, the weight to be supported increases. For this reason, it is not easy for a worker to remove slag S manually using slag removal tools 60, 70, 80, 90, and 100 such as those described above. In contrast therewith, in the present embodiment, the slag S is removed not by a worker, but by the drive mechanism 11 gripping the slag removal tools 60, 70, 80, 90, and 100. Thus, the burden on workers can be reduced while also efficiently removing slag S.

Additionally, the variously shaped slag removal tools 60, 70, 80, 90, and 100 can be used differently, for example, in accordance with the generation positions, the generated amounts, the distributions, and the like of the slag S. Therefore, the slag S can be more efficiently removed.

In particular, the third slag removal tool 80 and the fourth slag removal tool 90 have a prescribed length in the axial direction CR of the rods 81 and 91, and comprise slag adhesion portions 82*a*, 82*b*, and 92*a* around the axis.

Specifically, in the third slag removal tool 80, the slag removal portion 82 has a cylindrical shape. Additionally, in the fourth slag removal tool 90, the slag removal portion 92 is formed by providing a plurality of discs 92*a* that are spaced from each other in the axial direction CR of the rod 91.

Due to the above-mentioned feature, the adhesion area of the slag S can be made larger, so that the slag S is more easily cooled and the amount of slag S that can be removed each time the work tool 14 is placed in the melting furnace 2 can be increased. As a result thereof, the slag S can be efficiently removed.

Furthermore, the fourth slag removal tool 90 comprises a drive portion 94 that can rotate about the axis of the rod 91, and the drive portion 94 can be fixed to the drive mechanism 11.

Due to the above-mentioned feature, the drive portion 94 is fixed to the drive mechanism 11 and the drive portion 94 can rotate the rod 91 about the axis, thereby allowing the slag removal portion 92 provided on the fourth slag removal tool 90 to be rotated in a state in which the drive mechanism 11 is gripping the fourth slag removal tool 90. As a result thereof, the slag S can be adhered so as to be wound onto the slag removal portion 92, thereby allowing the amount of slag S that can be removed each time the work tool 14 is placed in the melting furnace 2 to be further increased.

Furthermore, in the fourth slag removal tool 90, when the fourth slag removal tool 90 rotates the rod 91 by means of the drive portion 94, the drive mechanism 11 makes the fourth slag removal tool 90 revolve about an imaginary axis V extending in the up-down direction, in a revolution direction R that is the same as the rotation direction D of the rod 91, while maintaining the height position of the slag removal portion 92.

Due to the above-mentioned feature, the fourth slag removal 90 is made to revolve, thereby allowing the amount of slag S that can be removed each time the work tool 14 is placed in the melting furnace 2 to be further increased.

The direction R of this revolution is the same direction as the rotation direction D of the slag removal portion 92. If the direction R of the revolution were different from the rotation direction D of the slag removal portion 92, then the rotation of the slag removal portion 92 would cause the slag S located in front of the direction of advancement of the revolution to flow towards the radially outer side of the melting furnace, i.e., towards the inside surface 2*c* of the melting furnace 2, where it could adhere to the inside surface 2*c*. By making the direction R of the revolution the same as the rotation direction D of the rod 91, the slag S located in front of the direction of advancement of the revolution can be made to flow, not towards the inside surface 2*c* of the melting furnace 2, but rather towards the radially inner side of the melting furnace 2. For this reason, it is possible to suppress the adhesion of the slag S on the inside surface 2*c*.

Additionally, the plurality of work tools 14 comprise a melt surface detection tool 30 comprising a melt surface detection portion 32 that is provided on the tip of a rod 31 and that detects the height position of the melt surface B of the melt L.

As already explained, for various reasons, it is not easy to keep the height position of the melt surface B of the melt L at a fixed location. Thus, for example, when the drive mechanism 11 is controlled by a program prepared by teaching, it is necessary to recognize the relative positional relationship between the tip of the work tool 14 and the melt surface B of the melt.

Due to the above-mentioned feature, the height position of the melt surface B of the melt L can be detected by the melt surface detection tool 30, so the work performed by the drive mechanism 11 using the work tools 14 can be precisely executed.

Additionally, the melt surface detection portion 32 comprises rod-shaped first and second electrodes 33 and 34, and the first electrode 33 is provided so as to protrude further from the rod 31 than the second electrode 34 does.

Due to the above-mentioned feature, as already explained, detection error in the height position of the melt L can be suppressed.

Additionally, the plurality of work tools 14 comprise a sampling tool 40 comprising a sample-making portion 42 that is provided on the tip of a rod 40 and that scoops up the melt L to make an ingot 120.

Due to the above-mentioned feature, the melting work device 10 can perform sampling work.

Additionally, the sample-making portion 42 comprises a recess 42*a*, and the recess 42*a* is formed so as to have a tapered shape in which the opening 42*b* is larger than the bottom surface 42*c*.

Due to the above-mentioned feature, a metal that has solidified inside the sample-making portion 42 can be easily extracted from the recess 42*a* of the sample-making portion 42.

Additionally, the sample-making portion 42 is made of carbon.

Due to the above-mentioned feature, melt that has been scooped into the recess 42*a* in the sample-making portion 42 can be quickly solidified.

Additionally, when raising the sampling tool 40 and scooping up the melt L in the recess 42*a*, the control device 12 controls the drive mechanism 11 so that the sampling tool 40 is tilted relative to the vertical direction and lowered towards the melt in the melting furnace 2, and the sampling tool 40 is raised with the rod 41 remaining in a tilted state relative to the vertical direction.

Due to the above-mentioned feature, as already explained, after the melt L has solidified, the melt L is kept from solidifying on the upper surface 42*d*, and situations in which it becomes difficult to extract the metal from the sample-making portion 42 due to metal that has solidified on the upper surface 42*d* sticking to the upper surface 42*d* can be suppressed.

Additionally, the plurality of work tools 14 comprise an auxiliary material charging tool 110 comprising an auxiliary material loading portion 112 that is provided on the tip of a rod 111 and on which an auxiliary material can be loaded.

Due to the above-mentioned feature, the melting work device 10 can perform auxiliary material charging work.

Additionally, the plurality of work tools 14 comprise a temperature measurement tool 50 that measures the temperature of the melt L.

Due to the above-mentioned feature, the melting work device 10 can measure the temperature of the melt L.

Additionally, in the present embodiment, the melting furnace 2 melts casting steel.

For example, with casting iron, when removing slag, it is possible to sprinkle quartzite or the like to solidify the slag, making it easier to remove. However, casting steel has a melting temperature that is higher than that of casting iron, i.e., 1550° C. or higher, at which quartzite melts, so it is not easy to remove slag.

However, in the present embodiment, it is possible to use slag removal tools for removing slag S by causing it to adhere, such as, for example, the third slag removal tool 80 and the fourth slag removal tool 90 mentioned above. Therefore, it is possible to efficiently remove slag S even when melting casting steel, from which it is not easy to remove the slag S.

Additionally, the drive mechanism 11 is a robot arm. This robot arm is controlled by a program that is prepared by teaching.

Due to the above-mentioned feature, the drive mechanism 11 can be automatically controlled.

Additionally, the melting work device 10 further comprises an input device 20 provided at a distance from the drive mechanism 11, and the drive mechanism 11 is remotely operated by means of inputs to the input device 20.

Due to the above-mentioned feature, a worker can manually operate the drive mechanism 11 when performing work requiring fine movements such as, for example, slag removal, and work that is highly dependent on the results of the observation of conditions inside the melting furnace 2 by the worker. In other words, there is no need to be completely dependent on the program prepared by teaching, so the development of the program is comparatively easy. Therefore, it is possible to easily produce the melting work device 10, and the development cost can be reduced.

Furthermore, the precision of slag removal can be improved.

Additionally, the drive mechanism 11 comprises two gripping portions 11*j*, and different parts of the work tools 14 are gripped by these two gripping portions 11*j*.

Due to the above-mentioned feature, the work tools 14 can be securely gripped.

First Modified Example of Embodiment

Figure 22:
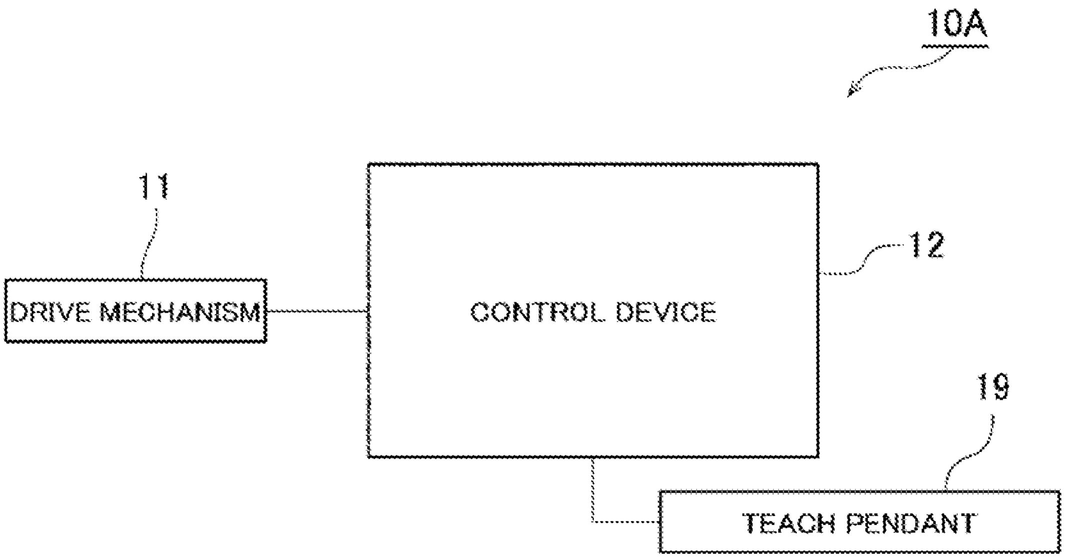
FIG. 22 is a block diagram of a melting work device in a first modified example of the above-mentioned embodiment.

Next, a first modified example of the melting work device 10 that was described as the above-mentioned embodiment will be explained by using FIG. 22. FIG. 22 is a block diagram of a melting work device 10A according to the present first modified example. The melting work device 10A of the present first modified example differs from the melting work device 10 in the above-mentioned embodiment in that an input device 20 is not provided. In cases in which the melting work of the melting work device 10A is only work that can be performed by a program or the like, the melting work device 10A can be realized by means of such a configuration.

Second Modified Example of Embodiment

Figure 23:
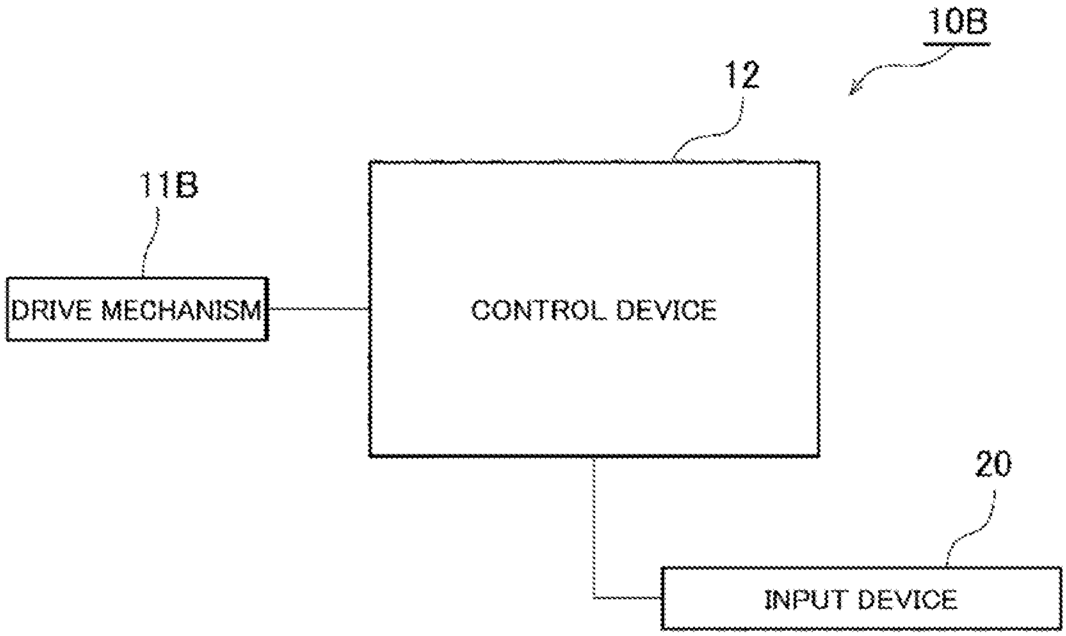
FIG. 23 is a block diagram of a melting work device in a second modified example of the above-mentioned embodiment.

Next, a second modified example of the melting work device 10 that was described as the above-mentioned embodiment will be explained by using FIG. 23. FIG. 23 is a block diagram of a melting work device 10B according to the present second modified example. The melting work device 10B of the present second modified example differs from the melting work device 10 in the above-mentioned embodiment in that the drive mechanism 11B is not a robot arm, but rather a working arm that is assumed to be operated by a worker, and in accordance therewith, a teaching pendant 19 is not provided.

Third Modified Example of Embodiment

Figure 24:
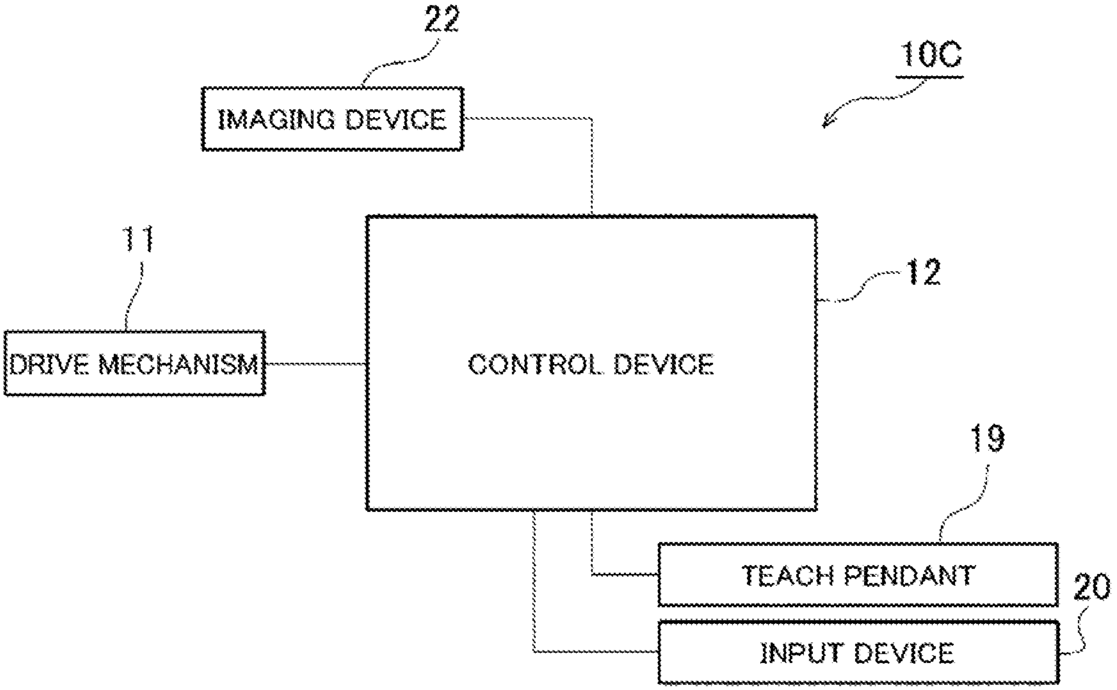
FIG. 24 is a block diagram of a melting work device in a third modified example of the above-mentioned embodiment.

Next, a third modified example of the melting work device 10 that was described as the above-mentioned embodiment will be explained by using FIG. 24. FIG. 24 is a block diagram of a melting work device 10C according to the present fourth modified example. The melting work device 10C of the present third modified example differs from the melting work device 10 in the above-mentioned embodiment in that an imaging device 22 is provided.

The imaging device 22 captures images of the melting furnace 2, and the control device 12 analyzes the position, amount, distribution, and the like of the slag S on the melt surface B in the melting furnace 2 on the basis of images captured by the imaging device 22. Based on this analysis information, the control device 12 determines the type of slag removal tool 60, 70, 80, 90, or 100 to be used and the lowering position above the melting furnace 2, controls the drive mechanism (robot arm) 11, and removes the slag.

The analysis of the slag in the control device 12 may be performed, for example, by means of artificial intelligence.

The melting work device and the melting work method in the present invention are not limited to the above-mentioned embodiments and modified examples explained with reference to the drawings, and various other modified examples may be contemplated within the technical scope thereof.

For example, in the above-mentioned embodiment, the melting furnace 2 melts casting steel, but it is also possible to melt other metals, such as casting iron, as long as the invention does not depart from the spirit of the present invention.

Additionally, in the above-mentioned embodiments, the electrodes 33 and 34 on the melt surface detection tool 30 were connected to power supply sensors and the like provided outside the drive mechanism 11, but it goes without saying that the invention is not limited thereto. For example, a detection circuit may be formed by contact with the gripping tip portions 11*l* when the melt surface detection tool 30 is gripped by the gripping tip portions 11*l* of the drive mechanism 11, or terminals may be provided on the gripping portions 11*j*, and a detection circuit may be formed by connection thereto.

Additionally, in the above-mentioned embodiment, the slag removal portion 92 on the fourth slag removal tool 90 was formed by providing a plurality of discs 92*a* that are spaced from each other over a prescribed length in the axial direction CR of the rod 81. However, the invention is not limited thereto.

Figure 25:
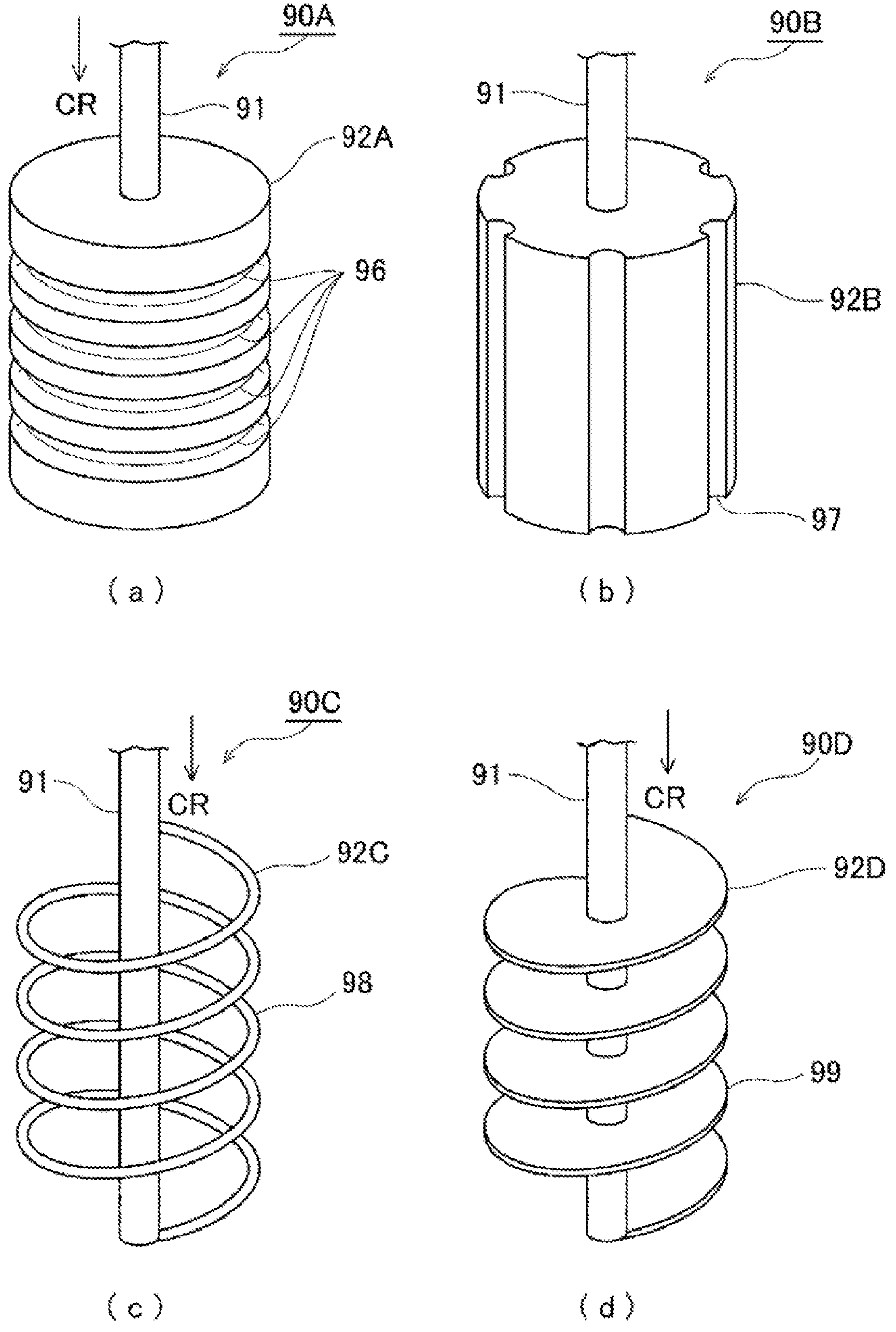
FIG. 25 is a perspective view of a modified example of a slag removal tool in the above-mentioned embodiment.

For example, as illustrated in FIG. 25(*a*), the slag removal portion 92A on the fourth slag removal tool 90A may comprise a plurality of recessed strips 96 extending in the circumferential direction on the side surfaces of a cylindrical shape.

Additionally, as illustrated in FIG. 25(*b*), the slag removal portion 92B on the fourth slag removal tool 90B may comprise a plurality of recessed strips 97 extending in the axial direction.

Additionally, as illustrated in FIGS. 25(*c*) and (*d*), the slag removal portions 92C and 92D on the fourth slag removal tool 90C and 90D may be formed by providing a metallic wire 98 or a metallic plate 99 in the shape of a screw that is wound so as to surround the axis of the rod 91.

Thus, by forming the slag removal portions 92, 92A, 92B, 90C, and 90D so as to be provided with slag adhesion portions having a large surface area, the adhesion area of the slag S can be made large.

Alternatively, the melting work device may have one or all of the fourth slag removal tools 90A, 90B, 90C, and 90D that were explained by using FIG. 25 in addition to the fourth slag removal tool 90 explained as the above-mentioned embodiment.

Additionally, in the above-mentioned embodiment, the fourth slag removal tool 90 revolved, but in addition thereto, or instead thereof, it could be moved linearly.

Additionally, when the slag removal tool 90 rotates the rod 91 by means of the drive portion 94, the drive mechanism 11 may move the rod 91 in the up-down direction while keeping the height position of the slag removal portion 92 within a fixed range, in the up-down direction, for capturing the slag S.

Additionally, in the above-mentioned embodiment, only the fourth slag removal tool 90 was provided with a drive portion 94, but drive portions could be provided on the other slag removal tools and the slag removal portions could be rotated.

Figure 26:
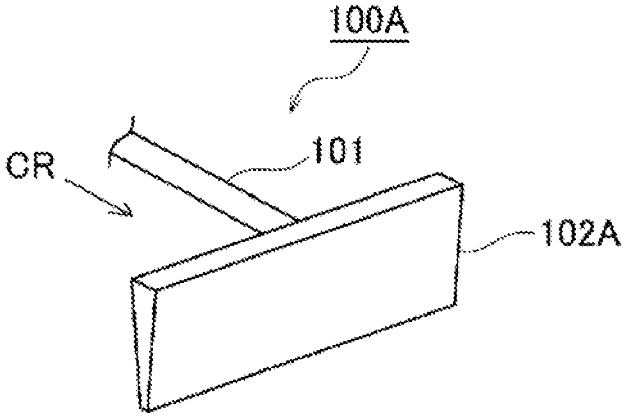
FIG. 26 is a perspective view of a modified example of a slag removal tool in the above-mentioned embodiment.

Additionally, in the above-mentioned embodiment, the slag removal portion 102 on the fifth slag removal tool 100 was provided so that the width direction of the rectangular shape was aligned with the axial direction CR of the rod 101, but the invention is not limited thereto. For example, the rod 101 may be attached so as to perpendicularly intersect the slag removal portion 102A, as in the fifth slag removal tool 100A illustrated in FIG. 26.

In this case, the control device 12 controls the drive mechanism 11 so that slag is removed with the slag removal portion 102A positioned perpendicular to the melt surface B, in other words, with the fifth slag removal tool 100A positioned so that the rod 101 extends substantially horizontally.

Additionally, in the above-mentioned embodiment, regarding the sampling tool 40, the control device 12 controls the drive mechanism 11 so that the sampling tool 40 is raised while the sampling tool 40 is gripped by the drive mechanism 11 with the rod 41 tilted relative to the vertical direction, but the invention is not limited thereto. For example, it goes without saying that the control device 12 may raise the sampling tool 40 from the melting furnace 2 with the sampling tool 40 gripped so that the rod 41 extends in the vertical direction, and after stopping the sampling tool 40, the control device 12 may tilt the sampling tool 40 for just a certain period of time above the melting furnace 2.

Additionally, after inverting the sampling tool 40 above the chute 17, vibrations may be applied to the sampling tool 40 by the drive mechanism 11, so that the ingot 120 will more easily drop from the sample-making portion 42.

Additionally, in the above-mentioned embodiment, the power supply of the thermometer body 51 on the thermometer measurement tool 50 may be turned on or off by a worker, or may be switched by wireless or the like.

Similarly, the checking of the measurement results in the temperature measurement tool 50 is not limited to being performed visually by a worker, and it goes without saying that the invention may be configured so that, for example, the temperature measurement tool 50 transmits the measurement results to the control device 12 by wireless.

Additionally, the invention may be configured so that the tilting device of the melting furnace 2 cooperates with the control device 12 in the melting work device 10, and the control device 12 controls the tilting device and tilts the melting furnace 2.

Aside from the above, it is possible to select whether to add or remove features indicated in the above-mentioned embodiment and modified examples, or to make appropriate modifications to other features, as long as they do not depart from the spirit of the present invention.

REFERENCE SIGNS LIST

1 Melting equipment
2 Melting furnace
10, 10A, 10B, 10C Melting work device
11, 11B Drive mechanism
11*j* Gripping portion
12 Control device
13 Work tool rack
14 Work tool
19 Teach pendant
20 Input device
22 Imaging device
30 Melt surface detection tool
31 Rod
32 Melt surface detection portion
33 First electrode
34 Second electrode
40 Sampling tool
41 Rod
42 Sample-making portion
42*a* Recess
42*b* Opening
42*c* Bottom surface of recess
50 Temperature measurement tool
60 First slag removal tool (slag removal tool)
70 Second slag removal tool (slag removal tool)
80 Third slag removal tool (slag removal tool)
90, 90A, 90B, 90C, 90D Fourth slag removal tool (slag removal tool)
100 Fifth slag removal tool (slag removal tool)
61, 71, 81, 91, 101 Rod
62, 72, 82, 92, 92A, 92B, 92C, 92D, 102 Slag removal portion
82*a* Side surface (slag adhesion portion)
82*b* Bottom surface (slag adhesion portion)
92*a* Disc (slag adhesion portion)
94 Drive portion
96 Recessed strip (slag adhesion portion)
98 Metal wire (slag adhesion portion)
99 Metal plate (slag adhesion portion)
110 Auxiliary material charging tool
111 Rod
120 Ingot
B Melt surface
R Revolution direction
CR Axial direction
D Rod rotation direction
L Melt
V Imaginary axis
S Slag

The invention claimed is:

1. A melting work device for performing work on a melt obtained by melting a material in a melting furnace, the melting work device comprising:
a drive mechanism; and
a plurality of work tools that are operated by the drive mechanism;
wherein the drive mechanism is able to move the work tools in an arbitrary direction at an arbitrary location above the melting furnace;
the plurality of work tools comprise a slag removal tool for removing slag floating on a melt surface of the melt;
the slag removal tool comprises a slag removal portion provided on a tip of a rod;
the slag removal portion has a prescribed length in an axial direction of the rod and comprises a slag adhesion portion around an axis of the rod;
the slag removal portion has a cylindrical shape; and
the slag removal portion comprises a plurality of recessed strips extending in a circumferential direction continuously around an outer surface of the cylindrical shape.

2. The melting work device as in claim 1, wherein:
the slag removal tool comprises a drive portion that can rotate the rod about the axis; and
the drive portion can be fixed to the drive mechanism.

3. The melting work device as in claim 2, wherein, when the slag removal tool causes the rod to be rotated by the drive portion, the drive mechanism makes the slag removal tool revolve about an imaginary axis extending in an up-down direction, in a rotation direction that is the same as the rotation direction of the rod, while maintaining a height position of the slag removal portion.

4. The melting work device as in claim 2, wherein, when the slag removal tool causes the rod to be rotated by the drive portion, the drive mechanism makes the rod move in an up-down direction while maintaining a height position of the slag removal portion within a fixed range, in the up-down direction, for capturing the slag.

5. The melting work device as in claim 1, wherein the plurality of work tools comprise a melt surface detection tool comprising a melt surface detection portion that is provided on a tip of a-another rod and that detects a height position of a melt surface of the melt.

6. The melting work device as in claim 5, wherein:
the melt surface detection portion comprises rod-shaped first and second electrodes; and
the first electrode is provided so as to protrude further from the other rod than the second electrode does.

7. The melting work device as in claim 1, wherein the plurality of work tools comprise a sampling tool comprising a sample-making portion that is provided on a tip of another rod and that scoops up the melt to make an ingot.

8. The melting work device as in claim 7, wherein the sample-making portion comprises a recess, and the recess is formed in a tapered shape in which an opening is larger than a bottom surface.

9. The melting work device as in claim 7, wherein the sample-making portion is made of carbon.

10. The melting work device as in claim 1, wherein the melting furnace melts casting steel.

11. The melting work device as in claim 1, wherein the drive mechanism is a robot arm.

12. The melting work device as in claim 11, wherein the robot arm is controlled by a program that has been prepared by teaching.

13. The melting work device as in claim 11, further comprising:

an imaging device for capturing an image of the melting furnace;

wherein the robot arm removes slag based on the image captured by the imaging device.

14. The melting work device as in claim 1, further comprising:

an input device provided at a distance from the drive mechanism;

wherein the drive mechanism is remotely operated by an input to the input device.

15. A melting work device for performing work on a melt obtained by melting a material in a melting furnace, the melting work device comprising:

a drive mechanism; and a plurality of work tools that are operated by the drive mechanism;

wherein the drive mechanism is able to move the work tools in an arbitrary direction at an arbitrary location above the melting furnace;

the plurality of work tools comprise a slag removal tool for removing slag floating on a melt surface of the melt;

the slag removal tool comprises a slag removal portion provided on a tip of a rod;

the slag removal portion has a prescribed length in an axial direction of the rod and comprises a slag adhesion portion around an axis of the rod; and the slag removal portion is formed by providing a plurality of discs that are spaced from each other in the axial direction of the rod.

16. The melting work device as in claim 15, wherein:

the slag removal tool comprises a drive portion that can rotate the rod about the axis; and the drive portion can be fixed to the drive mechanism.

17. The melting work device as in claim 16, wherein, when the slag removal tool causes the rod to be rotated by the drive portion, the drive mechanism makes the slag removal tool revolve about an imaginary axis extending in an up-down direction, in a rotation direction that is the same as the rotation direction of the rod, while maintaining a height position of the slag removal portion.

18. The melting work device as in claim 16, wherein, when the slag removal tool causes the rod to be rotated by the drive portion, the drive mechanism makes the rod move in an up-down direction while maintaining a height position of the slag removal portion within a fixed range, in the up-down direction, for capturing the slag.

19. The melting work device as in claim 15, wherein the plurality of work tools comprise a melt surface detection tool comprising a melt surface detection portion that is provided on a tip of another rod and that detects a height position of a melt surface of the melt.

20. The melting work device as in claim 19, wherein:

the melt surface detection portion comprises rod-shaped first and second electrodes; and the first electrode is provided so as to protrude further from the other rod than the second electrode does.

21. The melting work device as in claim 15, wherein the plurality of work tools comprise a sampling tool comprising a sample-making portion that is provided on a tip of another rod and that scoops up the melt to make an ingot.

22. The melting work device as in claim 21, wherein the sample-making portion comprises a recess, and the recess is formed in a tapered shape in which an opening is larger than a bottom surface.

23. The melting work device as in claim 21, wherein the sample-making portion is made of carbon.

24. The melting work device as in claim 15, wherein the melting furnace melts casting steel.

25. The melting work device as in claim 15, wherein the drive mechanism is a robot arm.

26. The melting work device as in claim 25, wherein the robot arm is controlled by a program that has been prepared by teaching.

27. The melting work device as in claim 25, further comprising:

an imaging device for capturing an image of the melting furnace;

wherein the robot arm removes slag based on the image captured by the imaging device.

28. The melting work device as in claim 15, further comprising:

an input device provided at a distance from the drive mechanism;

wherein the drive mechanism is remotely operated by an input to the input device.

* * * * *